United States Patent
Matsumoto et al.

(10) Patent No.: US 11,970,585 B2
(45) Date of Patent: Apr. 30, 2024

(54) METHOD FOR PRODUCING WATER-ABSORBENT RESIN

(71) Applicant: NIPPON SHOKUBAI CO., LTD., Osaka (JP)

(72) Inventors: Satoshi Matsumoto, Himeji (JP); Kenji Kadonaga, Himeji (JP); Kunihiko Ishizaki, Himeji (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 744 days.

(21) Appl. No.: 17/055,174

(22) PCT Filed: May 16, 2019

(86) PCT No.: PCT/JP2019/019517
§ 371 (c)(1),
(2) Date: Nov. 13, 2020

(87) PCT Pub. No.: WO2019/221235
PCT Pub. Date: Nov. 21, 2019

(65) Prior Publication Data
US 2021/0147637 A1 May 20, 2021

(30) Foreign Application Priority Data

May 16, 2018 (JP) .................. 2018-094788
Nov. 8, 2018 (JP) .................. 2018-210731

(51) Int. Cl.
| C08J 3/12 | (2006.01) |
| C08F 20/06 | (2006.01) |
| C08J 3/075 | (2006.01) |
| C08J 3/20 | (2006.01) |
| C08J 3/24 | (2006.01) |

(52) U.S. Cl.
CPC .............. *C08J 3/12* (2013.01); *C08F 20/06* (2013.01); *C08J 3/075* (2013.01); *C08J 3/20* (2013.01); *C08J 3/203* (2013.01); *C08J 3/245* (2013.01); *C08J 2300/14* (2013.01)

(58) Field of Classification Search
None
See application file for complete search history.

(56) References Cited

U.S. PATENT DOCUMENTS

| 5,064,582 A | 11/1991 | Sutton et al. |
| 5,342,599 A * | 8/1994 | Slone ............... B01D 53/56 423/236 |
| 5,350,799 A | 9/1994 | Woodrum et al. |
| 6,174,978 B1 * | 1/2001 | Hatsuda ............ C08F 220/04 422/138 |
| 6,228,930 B1 * | 5/2001 | Dairoku .............. B29B 9/12 524/502 |
| 6,458,921 B1 | 10/2002 | Dairoku et al. |
| 2001/0025093 A1 | 9/2001 | Ishizaki et al. |
| 2003/0008946 A1 | 1/2003 | Dairoku et al. |
| 2006/0183828 A1 | 8/2006 | Dairoku et al. |
| 2006/0247351 A1 | 11/2006 | Torii et al. |
| 2010/0062252 A1 | 3/2010 | Kimura et al. |
| 2011/0003926 A1 | 1/2011 | Nogi et al. |
| 2011/0006140 A1 | 1/2011 | Ishizaki et al. |
| 2011/0009590 A1 | 1/2011 | Matsumoto et al. |
| 2011/0011491 A1 | 1/2011 | Matsumoto et al. |
| 2011/0015351 A1 | 1/2011 | Nogi et al. |
| 2011/0028670 A1 | 2/2011 | Matsumoto et al. |
| 2011/0088806 A1 | 4/2011 | Nogi et al. |
| 2011/0110730 A1 | 5/2011 | Nogi et al. |
| 2011/0166300 A1 | 7/2011 | Dairoku et al. |
| 2011/0237739 A1 | 9/2011 | Tada et al. |
| 2013/0102750 A1 | 4/2013 | Watanabe et al. |
| 2013/0261276 A1 * | 10/2013 | Matsumoto ............... C08J 3/12 526/320 |
| 2015/0259522 A1 | 9/2015 | Lee et al. |
| 2016/0045895 A1 | 2/2016 | Won et al. |
| 2017/0044281 A1 * | 2/2017 | Fujino ..................... C08F 2/01 |
| 2017/0166707 A1 | 6/2017 | Jang |
| 2018/0298132 A1 * | 10/2018 | Yorino ................... C08K 5/32 |

FOREIGN PATENT DOCUMENTS

| EP | 1130045 A2 | 9/2001 |
| EP | 2787025 A1 | 10/2014 |
| EP | 2957576 A | 12/2015 |
| JP | H03152104 A | 6/1991 |
| JP | H0441532 A | 2/1992 |
| JP | H04227934 A | 8/1992 |
| JP | H11106514 A | 4/1999 |
| JP | H11140194 A | 5/1999 |
| JP | H11240959 A | 9/1999 |
| JP | H11254429 A | 9/1999 |
| JP | 2005054151 A | 3/2005 |
| JP | 2006299234 A | 11/2006 |

(Continued)

OTHER PUBLICATIONS

Chinese Decision of Rejection dated Apr. 25, 2023, which issued in the corresponding Chinese Patent Application No. 201980032452.9, including English machine translation.

(Continued)

*Primary Examiner* — Nicole M. Buie-Hatcher

(74) *Attorney, Agent, or Firm* — Dickinson Wright PLLC

(57) ABSTRACT

The present invention addresses the problem of reducing the undried residue when recycling a fine powder of water-absorbing resin. The present invention is a method for producing a water-absorbing resin, wherein: a fine powder recycling step includes vi-1) a granulation step for obtaining a granulated gel, vi-2) a granulated gel addition step, and vi-3) a gel mixing step; the solids content of the granulated gel in the granulated gel addition step is 50-90% by mass; and the temperature of the granulated gel and the temperature of the water-containing gel-like crosslinked polymer is 50-100° C.

10 Claims, No Drawings

(56) References Cited

FOREIGN PATENT DOCUMENTS

| | | | |
|---|---|---|---|
| JP | 2010538095 A | 12/2010 | |
| KR | 20170092314 A | 8/2017 | |
| WO | 2006098271 A1 | 9/2006 | |
| WO | 2009031701 A1 | 3/2009 | |
| WO | 2009113673 A1 | 9/2009 | |
| WO | 2009113678 A1 | 9/2009 | |
| WO | 2009113679 A1 | 9/2009 | |
| WO | 2009119754 A1 | 10/2009 | |
| WO | 2011136301 A1 | 11/2011 | |
| WO | 2015041432 A1 | 3/2015 | |
| WO | WO-2016204302 A1 * | 12/2016 | ............. A61L 15/00 |

OTHER PUBLICATIONS

Korean Office Action dated Mar. 22, 2023, which issued in the related Korean Application No. 10 2020 7035702, Including English machine translation.

Korean Office Action dated Mar. 26, 2023, which issued in the corresponding Korean Application No. 10 2020 7035703, including English machine translation.

Chinese Office Action dated Nov. 30, 2022, which issued in the related Chinese Application (No. 201980032452.9), including English translation.

Chinese Office Action dated Dec. 27, 2022, which issued in the corresponding Chinese Application No. 201980032510.8), including English translation.

European Extended Search Report dated Jan. 28, 2022, which issued in the related European Application No. 19803772.3.

European Extended Search Report dated Feb. 23, 2022, which issued in the corresponding European Application No. 19802522.3.

Japanese Office Action dated Apr. 27, 2021, which issued in the corresponding Japanese Patent Application No. 2020-519919, including Eng. translation.

Japanese Office Action dated Oct. 19, 2021, which issued in the corresponding Japanese Patent Application No. 2020-519920, including Eng. translation.

International Search Report dated Aug. 20, 2019, which issued in the corresponding PCT Patent Application No. PCT/JP2019/019517.

Modern Superabsorbents Polymer Chemistry (1998), Modern Superabsorbent Polymer Technology, Edited by Fredric L. Buchholz et al., pp. 69 to 103.

Chinese Office Action dated Sep. 15, 2023, which issued in the corresponding Chinese Patent Application No. 201980032510.8, including English machine translation.

U.S. Office Action dated Oct. 3, 2023, issued in U.S. Appl. No. 17/055,153.

* cited by examiner

METHOD FOR PRODUCING
> WATER-ABSORBENT RESIN

TECHNICAL FIELD

The present invention relates to a method for producing a water-absorbent resin, and more particularly relates to a method for producing a water-absorbent resin containing recycled fine powder obtained in the production process for the water-absorbent resin.

BACKGROUND ART

A water-absorbent resin is a water-swellable and water-insoluble polymer gelling agent, and has been used for various applications such as absorbent articles such as disposable diapers and sanitary napkins, soil water retention agents for agricultural and horticultural use, and industrial water stopping agents. For such a water-absorbent resin, many types of monomers and hydrophilic polymers have been employed as a raw material. However, a polyacrylic acid (salt) water-absorbent resin which uses acrylic acid and/or salts thereof (hereinafter described as "acrylic acid (salt)") as a monomer has been most frequently used from the viewpoint of their high water absorption performance and production cost.

On the other hand, generally, in the water-absorbent resin, the content of fine powder having a particle diameter of 150 μm or less is preferably small as much as possible. Such a fine powder causes deterioration of physical properties due to clogging even in absorbent articles such as disposable diapers. Further, in addition to loss as dust at the time of handling, there is a problem that the physical properties such as an absorption capacity under pressure is less likely to be improved even when such a fine powder is surface-crosslinked. For this reason, a water-absorbent resin containing less fine powder has been desired.

Conventionally, as a method of producing a water-absorbent resin containing less fine powder, a method of optimizing the conditions for polymerization or crushing to adjust the particle size, and a method of classifying and removing generated fine powder with a sieve, air stream, or the like have been known. However, also in the above-described methods, a large amount of a dozen % by mass or more, several 10% by mass or less of fine powder is generated during the production process. Thus, disposal of fine powder generated by this method causes significant reduction in the yield and disadvantage in terms of disposal cost.

In light of this, proposals that solve the above-described problem by granulating and regenerating fine powder inevitably generated in the production process of the water-absorbent resin have been made (Patent Documents 1 to 14). Among these proposals, a technique of granulating fine powder by using water vapor (Patent Documents 5 and 7) emphasizes reduction in drying cost and improvement of drying efficiency due to reduction in moisture added.

PRIOR ART DOCUMENTS

Patent Documents

Patent Document 1: JP-A-11-106514
Patent Document 2: JP-A-11-140194
Patent Document 3: JP-A-11-254429
Patent Document 4: JP-A-11-240959
Patent Document 5: JP-A-2005-054151
Patent Document 6: JP-A-2006-299234
Patent Document 7: JP-T-2010-538095
Patent Document 8: EP-A-2957576
Patent Document 9: EP-A-2787025
Patent Document 10: US-A-2017/0166707
Patent Document 11: JP-A-03-152104
Patent Document 12: JP-A-04-041532
Patent Document 13: JP-A-04-227934
Patent Document 14: WO 2006/098271

SUMMARY OF THE INVENTION

Problems to be Solved by the Invention

There is a room for further improvement of the above-described techniques. That is, the present inventors found a problem that it is advantageous to dry a granulated gel obtained by adding water to fine powder to perform granulation, and a hydrogel crosslinked polymer obtained by polymerizing an aqueous monomer solution together because only one dryer is required, but drying failure such as remaining of non-dried products after drying tends to occur. The present inventors found that a high gel solid content provides an advantage that drying cost can be reduced, but such a high solid content causes a new problem. The present inventors further studied and found that a granulated gel having a low moisture content has high adhesiveness and tends to form coarse aggregates, and when the coarse aggregates are present, the specific surface area is small, and thus significant drying failure occurs locally even in the case of being a low moisture content. That is, the hydrogel obtained by polymerization (hydrogel crosslinked polymer) and the granulated gel (fine powder granulated gel) obtained by fine powder collection are different to each other in their characteristics and drying efficiency. Therefore, drying these gels together is difficult due to drying efficiency and tends to cause decrease in productivity and deterioration of physical properties The present invention is made by focusing on the above-described circumstances, and an object of the present invention is to provide a technique that can reduce a problem in the case of granulating and recycling water-absorbent resin fine powder, specifically, a technique that can reduce remaining of non-dried products after drying, particularly, an efficient technique that dries a hydrogel obtained by polymerization and a granulated gel obtained by fine powder collection together.

Solutions to the Problems

One embodiment of the present inventive method [1], which solves above problem, includes:
  i) a polymerization step of polymerizing an aqueous monomer solution to obtain a hydrogel crosslinked polymer;
  ii) a gel crushing step of crushing the hydrogel crosslinked polymer, the step being performed in the middle of and/or after the polymerization step i);
  iii) a drying step of drying the hydrogel crosslinked polymer after the gel crushing step ii);
  iv) a crushing step of crushing a dried polymer after the drying step iii);
  v) a classifying step of removing fine powder from the dried polymer after the drying step iii); and
  vi) a fine powder recycling step of recycling the fine powder removed in the classifying step v) before the drying step iii), wherein the fine powder recycling step vi) includes:
vi-1) a granulation step of mixing the removed fine powder and an aqueous liquid to obtain a granulated gel;
vi-2) a granulated gel adding step of adding the granulated gel to the hydrogel crosslinked polymer in at least one step of and/or between the steps i) to iii) until completion of drying in the drying step iii); and
vi-3) a gel mixing step of mechanically mixing the hydrogel crosslinked polymer and the added granulated gel in at least one step of and/or between steps from the granulated gel adding step vi-2) to completion of drying in the drying step iii),
wherein, in the granulated gel adding step vi-2),
a solid content of the granulated gel is in a range of 50 mass % or more to 90 mass % or less, and
a temperature of the granulated gel is in a range of 50° C. or more to 100° C. or less.

Another embodiment of the present inventive method [2], which solves above problem, includes:
i) a polymerization step of polymerizing an aqueous monomer solution to obtain a hydrogel crosslinked polymer;
ii) a gel crushing step of crushing the hydrogel crosslinked polymer, the step being performed in the middle of and/or after the polymerization step i);
iii) a drying step of drying the hydrogel crosslinked polymer after the gel crushing step ii);
iv) a crushing step of crushing the dried polymer after the drying step iii);
v) a classifying step of removing fine powder from the dried polymer after the drying step iii); and
vi) a fine powder recycling step of recycling the fine powder removed in the classifying step v) before the drying step iii),
wherein the fine powder recycling step vi) includes:
vi-1) a granulation step of mixing the removed fine powder and an aqueous liquid to obtain a granulated gel;
vi-2) a granulated gel adding step of adding the granulated gel to the hydrogel crosslinked polymer in at least one step of and/or between the steps from the gel crushing step ii) to completion of drying in the drying step iii),
wherein a solid content of the granulated gel is in a range of 50 mass % or more to 90 mass % or less in the granulated gel adding step vi-2), and
wherein a gel crushing energy for gel crushing (GGE) is in a range of 20 J/g or more to 100 J/g or less in the gel crushing step ii).

As a preferred embodiment [3], the method according to above [2], wherein
a mass average particle diameter of the hydrogel crosslinked polymer after the gel crushing step ii) is in a range of 0.1 mm or more to 1.0 mm or less.

As a preferred embodiment [4], the method according to any one of above [1] to [3], wherein
a solid content of the granulated gel adding step vi-2) is in a range of 55 mass % or more to 85 mass % or less.

As a preferred embodiment [5], the method according to any one of above [1] to [4], the method further includes
a surface crosslinking step vii) of performing surface crosslinking treatment to a water-absorbent resin after removing the fine powder in the classification step v), and
a sizing step viii) of removing a fine powder from a water-absorbent resin after the surface crosslinking step vii), wherein
a fine powder having a mixing ratio (mass ratio) of the fine powder removed in the classifying step v) and the fine powder removed in the sizing step viii) in a range of 99:1 to 50:50 is used as the fine powder for mixing with the aqueous liquid in the fine powder recycling step vi).

As a preferred embodiment [6], the method according to any one of above [1] or [3] to [5], wherein
the mechanical mixing is performed by using a swing belt type feeder or by rotating stirring before the drying step iii) or until completion of drying in the drying step iii).

As a preferred embodiment [7], the method according to any one of above [1] to [6], wherein
drying is performed by a stirring dryer in the drying step iii).

As a preferred embodiment [8], the method according to any one of above [1] to [6], wherein
drying is performed by a ventilation band type dryer in the drying step iii);
an average thickness of a gel layer on the ventilation band; and
a thickness variation ratio in the ventilation band is in a range of 1.05 or more to 3 or less.

As a preferred embodiment [9], the method according to any one of above [1] to [8], wherein
a dew point of an atmosphere of the granulated gel is 50° C. or more between the granulation step vi-1) and the granulated gel adding step.

As a preferred embodiment [10], the method according to any one of above [1] to [9], wherein
a time period from a start of mixing of the fine powder and the aqueous liquid in the granulation step vi-1) to an addition of the resulting granulated gel to the hydrogel in the granulated gel adding step vi-2) is within 5 minutes.

As a preferred embodiment [11], the method according to any one of above [1] to [10], wherein
a surface tension of an extract extracted from the granulated gel with a 0.9% by mass sodium chloride aqueous solution is 65 mN/m or more, wherein the granulated gel is obtained by adding a surfactant before, in the middle of, or after one step selected from the polymerization step i), the gel crushing step ii), the drying step iii), the crushing step iv), and the classifying step v), and/or allowing a surfactant to be contained in an aqueous liquid, and mixing the fine powder and the aqueous liquid in the granulation step vi-1).

As a preferred embodiment [12], the method according to any one of above [1] to [11], wherein
the aqueous liquid is added a plurality of times in the granulation step vi-1);
a surface tension of an extract extracted from the granulated gel with a 0.9% by mass sodium chloride aqueous solution is 70 mN/m or more, the granulated gel being obtained by mixing the aqueous liquid added in the first time and the fine powder,
at least one time addition of the aqueous liquid out of aqueous liquids of a second and later addition contains a surfactant, and
a surface tension of an extract extracted from the granulated gel with a 0.9% by mass sodium chloride aqueous solution is 60 mN/m or more, the granulated gel being obtained by mixing the aqueous liquid containing the surfactant.

As a preferred embodiment [13], the method according to above [2] or [3], wherein
a mass average particle diameter of the hydrogel crosslinked polymer after the gel crushing step ii) relative to the mass average particle diameter of the primary particle of the granulated gel is in a range of 1 time or more to 10 times or less in the granulation step vi-2).

Effects of the Invention

Conventionally, a polymer gel and a fine powder granulated gel have different characteristics, and thus have been difficult to dry together. In contrast, the production method of the present invention can reduce, preferably eliminate remaining of non-dried products which becomes a problem when recycling water-absorbent resin fine powder more than before without increasing a drying load. In particular, the production method of the present invention can provide an efficient technique that dries a hydrogel obtained by polymerization and a granulated gel obtained by fine powder collection.

MODE FOR CARRYING OUT THE INVENTION

Hereinafter, the method of producing a water-absorbent resin according to the present invention will be described in detail. However, the scope of the present invention is not intended to be restrained by these descriptions, and embodiments other than the following examples can also be appropriately modified and carried out to the extent that the gist of the present invention is not impaired. Specifically, the present invention is not intended to be limited to the various exemplary embodiments described below, and can be modified into various embodiments within the scope illustrated by the claims. Exemplary embodiments that can be obtained by appropriately combining the technical means that are respectively disclosed in different exemplary embodiments, are also included in the technical scope of the present invention.

[1] Definition of Terms

[1-1] Water-Absorbent Resin and Water-Absorbing Agent

The "water-absorbent resin" in the present specification means a water-swellable and water-insoluble polymer gelling agent and is generally powder. Meanwhile, "water-swellable" means that the absorption capacity without pressure defined in WSP241.3 (10) (hereinafter, may be described as "CRC") is 5 g/g or more, and "water-insoluble" means that a soluble component defined in WSP270.3 (10) (hereinafter, may be described as "Ext") is 50% by mass or less.

The "water-absorbent resin" is preferably a hydrophilic crosslinked polymer obtained by crosslink-polymerizing an unsaturated monomer having a carboxyl group. The total amount thereof, that is, 100% by mass thereof needs not to be a crosslinked polymer. The water-absorbent resin may contain an additive or the like within a range that satisfies required performance of CRC, Ext, or the like.

The "water-absorbent resin" may refer to "a polymer in which only an internal portion is crosslinked, that is, a polymer in which the crosslinking densities of an internal portion and a surface portion of the water-absorbent resin are substantially equal to each other" or "a polymer in which an internal portion and a surface portion are crosslinked, that is, a polymer in which the crosslinking density of a surface portion of the water-absorbent resin is relatively higher than the crosslinking density of an internal portion of the water-absorbent resin".

In the present specification, the "polymer in which only an internal portion is crosslinked" and the "polymer in which an internal portion and a surface portion are crosslinked" are not basically distinguished, and both are described as "water-absorbent resin". Note that when the presence or absence of surface crosslinking needs to be clearly distinguished, the "polymer in which only an internal portion is crosslinked" is a polymer before application of surface crosslinking and thus is described as "water-absorbent resin before surface crosslinking, and the "polymer in which an internal portion and a surface portion are crosslinked" is a polymer after application of surface crosslinking and thus is described as "water-absorbent resin after surface crosslinking". Note that "before surface crosslinking" means "before a surface crosslinking agent is added" or "before crosslinking reaction by heat treatment is started even after the surface crosslinking agent has been added".

In addition, the "water-absorbent resin" refers to only a resin component in some cases, but may contain a component other than the additive or the like.

The "water-absorbing agent" in the present specification means a water absorbent resin in a state that can be shipped as a final product. Accordingly, the "water-absorbent resin" being in a state that can be shipped corresponds to the "water-absorbing agent", and the "water-absorbent resin" is synonymous with the "water-absorbing agent" at this time.

[1-2] Acrylic Acid (Salt) Monomer and Polyacrylic Acid (Salt) Water-Absorbent Resin The "acrylic acid (salt)" in the present specification means acrylic acid and/or a salt thereof, and the "acrylic acid (salt) monomer" means a monomer containing 50 mol % or more of acrylic acid (salt) relative to the entire monomer excluding a crosslinking agent.

The "polyacrylic acid (salt) water-absorbent resin" in the present specification means a polymer formed from a raw material acrylic acid (salt). That is, the "polyacrylic acid (salt) water-absorbent resin" is a polymer having a structural unit derived from acrylic acid (salt) and is a polymer having a graft component as an optional component.

Specifically, the polyacrylic acid (salt) water-absorbent resin is a polymer containing acrylic acid (salt) in an amount of preferably 50 mol % or more, more preferably 70 mol % or more, even more preferably 90 mol % or more, preferably 100 mol % or less, and particularly preferably substantially 100 mol % relative to a portion excluding an internal crosslinking agent in the monomers related to polymerization reaction.

[1-3] "EDANA" and "WSP"

"EDANA" is an abbreviation for the European Disposables and Nonwovens Associations. Also, "WSP" is an abbreviation for the Worldwide Strategic Partners, and represents a measurement method of the global standard for the water-absorbent resin provided by the EDANA. In the present specification, the physical properties of the water-absorbent resin are measured in accordance with the WSP original (revised in 2010). In the present specification, unless otherwise specified, measurement is performed in accordance with the measurement methods in the examples described below.

[1-4] "CRC" (WSP241.3 (10))

"CRC" is an abbreviation for Centrifuge Retention Capacity and means the absorption capacity without pressure of the water-absorbent resin. Specifically, the CRC is the absorption capacity (unit: g/g) obtained after 0.2 g of a water-absorbent resin is placed in a non-woven fabric bag, immersed in a large excess of a 0.9% by mass sodium chloride aqueous solution for 30 minutes to be freely swollen, and then is dehydrated using a centrifuge (centrifugal force: 250 G).

[1-5] "Ext" (WSP270.3 (10))

"Ext" is an abbreviation for Extractables and means a water-soluble component of the water-absorbent resin, that is, the amount of the water-soluble component. Specifically, the Ext is the amount of the dissolved polymer (unit: % by mass) after adding 1.0 g of a water-absorbent resin to 200 ml of a 0.9% by mass sodium chloride aqueous solution and stirring the mixture at 250 rpm for 1 hour or 16 hours. The measurement of the amount of the dissolved polymer is performed by using pH titration. The stirring time is descried in reporting the results.

[1-6] "PSD" (WSP220.3 (10))

"PSD" is an abbreviation for Particle Size Distribution and means the particle size distribution of the water-absorbent resin measured by sieve classification. Note that the mass average particle diameter (D50) and the logarithmic standard deviation (σζ) of the particle size distribution are measured by the same methods as in "(3) Mass-Average Particle Diameter (D50) and Logarithmic Standard Deviation (σζ) of Particle Diameter Distribution" described in U.S. Pat. No. 7,638,570.

Further, the particle size distribution, D50, and logarithmic standard deviation (σζ) of the particle size distribution of fine powder are measured under the above-described conditions by using a JIS standard sieve each having a mesh opening size of 38 μm, 45 μm, 75 μm, 106 μm, 150 μm, 180 μm, or the like.

[1-7] "Moisture Content" (WSP230.3 (10))

The "moisture content" means the moisture content of the water-absorbent resin. In the present invention, the moisture content is the value (unit: % by mass) calculated from the drying loss after drying for 3 hours when the amount of the water-absorbent resin and drying time defined in WSP 230.3 (10) are respectively changed from 4.0 g to 1.0 g, from 105° C. to 180° C. Note that the moisture content of the dried polymer is measured in accordance with the measurement method after the dried polymer is appropriately crushed.

Also, the moisture content of the hydrogel crosslinked polymer or the moisture content of the granulated gel is measured in accordance with the measurement method except for changing the amount of the sample to 2.0 g. The solid content is defined as [100−moisture content] (unit: % by mass).

[1-8] Others

In the present specification, the unit of mass, "t (ton)" means "metric ton". The unit "ppm (on a mass basis)" means "ppm by mass". The expression "-acid (salt)" means "-acid and/or a salt thereof", and "(meth)acryl" means "acryl and/or methacryl".

[2] Method of Producing Water-Absorbent Resin

A preferred method of producing a water-absorbent resin according to the present invention will be described in detail. A preferred method of producing a water-absorbent resin according to the present invention includes;
 i) a polymerization step of polymerizing an aqueous monomer solution to obtain a hydrogel crosslinked polymer;
 ii) a gel crushing step of crushing the hydrogel crosslinked polymer, the step being performed in the middle of and/or after the polymerization step i);
 iii) a drying step of drying the hydrogel crosslinked polymer after the gel crushing step ii);
 iv) a crushing step of crushing the dried polymer after the drying step iii);
 v) a classifying step of removing fine powder from the dried polymer after the drying step iii); and
 vi) a fine powder recycling step of recycling the fine powder removed in the classifying step v) before the drying step iii).

[2-1] Preparation Step of Aqueous Monomer Solution

This step is a step of preparing an aqueous monomer solution containing a monomer containing acrylic acid (salt) as a main component and at least one type of polymerizable internal crosslinking agent. A slurry solution of a monomer can be used in a range that does not affect the water absorption performance of the water-absorbing agent obtained as a final product. In the present specification, the case of an aqueous monomer solution will be described for the sake of convenience.

(Monomer)

Examples of the monomer used in the present invention include anionic unsaturated monomers and/or salts thereof such as acrylic acid, maleic acid (anhydride), itaconic acid, cinnamic acid, vinyl sulfonic acid, allyl toluene sulfonic acid, vinyl toluene sulfonic acid, styrene sulfonic acid, 2-(meth)acrylamide-2-methylpropane sulfonic acid, 2-(meth)acryloylethane sulfonic acid, 2-(meth)acryloylpropane sulfonic acid, and 2-hydroxyethyl (meth)acryloyl phosphate; mercapto group-containing unsaturated monomers; phenolic hydroxy group-containing unsaturated monomers; amide group-containing unsaturated monomers such as (meth)acrylamide, N-ethyl (meth)acrylamide, and N,N-dimethyl (meth)acrylamide; and amino group-containing unsaturated monomers such as N,N-dimethylaminoethyl (meth)acrylate, N,N-dimethylaminopropyl (meth)acrylate, and N,N-dimethylaminopropyl (meth)acrylamide. Further, the monomer includes a water-soluble or hydrophobic unsaturated monomer. Among them, acrylic acid (salt) is preferable. Further, acrylic acid (salt) and other monomers may be used in combination. In this case, the used amount of acrylic acid (salt) is preferably 50 mol % or more, more preferably 70 mol % or more, even more preferably 90 mol % or more, and particularly preferably substantially 100 mol % relative to amount of the entire monomer excluding the crosslinking agent.

(Neutralization with Basic Compound)

In a case where the acrylic acid (salt) monomer is used in the present invention, preferably, acrylic acid is partially neutralized by using a basic compound. That is, in the present invention, preferred is a water-absorbent resin in which an acid group of polyacrylic acid is partially neutralized.

Specific examples of the basic compound include carbonates or bicarbonates of alkaline metals, hydroxides of alkaline metals, ammonia, and organic amines. Among them, a strong basic compound is selected from the viewpoint of the water absorption performance of the water-absorbing agent or the water-absorbent resin. Accordingly, hydroxides of alkaline metals such as sodium, potassium, and lithium are preferable, and sodium hydroxide is more preferable. Note that the basic compound is preferably used as an aqueous solution from the viewpoint of the handleability. Note that commercially available sodium hydroxides contain heavy metals such as zinc, lead, and iron on the ppm order (on a mass basis) and, strictly, can be expressed as a composition. In the present invention, such a composition is also treated as being included in the category of the basic compound.

The timing at which the neutralization is performed may be before polymerization, during polymerization, or after polymerization. Neutralization can also be performed at a plurality of timings or at a plurality of sites. The neutralization is also preferably performed in a continuous manner from the viewpoint of the production efficiency of the water-absorbent resin.

In a case where acrylic acid (salt) is used in the present invention, the neutralization ratio thereof is preferably 10 mol % or more, more preferably 40 mol % or more, even more preferably 50 mol % or more, particularly preferably 60 mol % or more, preferably 90 mol % or less, more preferably 85 mol % or less, even more preferably 80 mol % or less, and particularly preferably 75 mol % or less relative to the acid group of the monomer. When the neutralization ratio is within the range, deterioration of the water absorption performance of the water-absorbent resin can be suppressed.

Note that the neutralization ratio is applied to any of the neutralization before polymerization, the neutralization during polymerization, and the neutralization after polymerization. In addition, the neutralization ratio is similarly applied to the water-absorbing agent as a final product.
(Internal Crosslinking Agent)

In a preferred production method of the present invention, an internal crosslinking agent is used. Specific examples of the internal crosslinking agent include N,N'-methylenebis(meth)acrylamide, (poly)ethylene glycol di(meth)acrylate, (poly)propylene glycol di(meth)acrylate, trimethylolpropane di(meth)acrylate, trimethylolpropane tri(meth)acrylate, glycerin tri(meth)acrylate, glycerin acrylate methacrylate, ethylene oxide-modified trimethylolpropane tri(meth)acrylate, pentaerythritol tetra(meth)acrylate, dipentaerythritol hexa(meth)acrylate, triallyl cyanurate, triallyl isocyanurate, triallyl phosphate, triallyl amine, poly(meth)allyloxyalkane, (poly)ethyleneglycol diglycidyl ether, glycerol diglycidyl ether, ethylene glycol, polyethylene glycol, propylene glycol, glycerin, pentaerythritol, ethylenediamine, polyethylene imine, and glycidyl (meth)acrylate. Among these internal crosslinking agents, at least one type of internal crosslinking agent is selected in consideration of the reactivity and the like.

In the present invention, preferably, an internal crosslinking agent having two or more polymerizable unsaturated groups, and more preferably, an internal crosslinking agent having two or more polymerizable unsaturated groups having a (poly)alkylene glycol structure is selected from the viewpoint of the water absorption performance of the water-absorbent resin or the like. Specific examples of the polymerizable unsaturated group include an allyl group and a (meth)acrylate group. Among them, a (meth)acrylate group is preferable. Specific examples of the internal crosslinking agent having two or more polymerizable unsaturated groups having a (poly)alkylene glycol structure include polyethylene glycol di(meth)acrylate. Note that the number of alkylene glycol units (hereinafter, may be also described as "n") is preferably 1 or more, more preferably 2 or more, even more preferably 4 or more, particularly preferably 6 or more, preferably 100 or less, more preferably 50 or less, even more preferably 20 or less, and particularly preferably 10 or less.

The used amount of the internal crosslinking agent is preferably 0.0001 mol % or more, more preferably 0.001 mol % or more, even more preferably 0.01 mol % or more, preferably 10 mol % or less, more preferably 5 mol % or less, and even more preferably 1 mol % or less relative to the amount of the monomer excluding the internal crosslinking agent. When the used amount is within the range, a water-absorbent resin having a desired water absorption performance can be obtained. On the other hand, a used amount that is outside of the range results in increase in the water-soluble component or decrease in the absorption capacity due to decrease in the gel strength in some cases.

In the present invention, the timing at which the internal crosslinking agent is added may be any timing as long as the polymer can be uniformly crosslinked. A method is exemplified in which an internal crosslinking agent is added to an aqueous monomer solution before polymerization, or added to a hydrogel crosslinked polymer during polymerization or after polymerization. In particular, a method is preferable in which a predetermined amount of internal crosslinking agent is added to an aqueous monomer solution in advance.
(Substance Added to Aqueous Monomer Solution)

In the present invention, the following substances can be added to the aqueous monomer solution at any one or more timings of during preparation of the aqueous monomer solution, during the period of the polymerization reaction and crosslinking reaction, and after the polymerization reaction and crosslinking reaction from the viewpoint of improving the physical properties of the water-absorbent resin.

Specific examples of the substance include hydrophilic polymers such as starch, starch derivatives, cellulose, cellulose derivatives, polyvinyl alcohol (PVA), polyacrylic acid (salt), and crosslinked products of polyacrylic acid (salt); and compounds such as carbonates, azo compounds, various foaming agents generating air bubbles, surfactants, chelate agents, and chain transfer agents.

The added amount of the hydrophilic polymer is preferably 50% by mass or less, more preferably 20% by mass or less, even more preferably 10% by mass or less, particularly preferably 5% by mass or less, preferably 0% by mass or more, and more preferably more than 0% by mass relative to the amount of the aqueous monomer solution. The added amount of the compound is preferably 5% by mass or less, more preferably 1% by mass or less, even more preferably 0.5% by mass or less, preferably 0% by mass or more, and more preferably more than 0% by mass relative to the amount of the aqueous monomer solution.

When a water-soluble resin or a water-absorbent resin is used as the hydrophilic polymer, a graft polymer or a water-absorbent resin composition, for example, a starch-acrylic acid (salt) copolymer, and a PVA-acrylic acid (salt) copolymer can be obtained. The graft polymer or water-absorbent resin composition is also included in the category of the polyacrylic acid (salt) water-absorbent resin according to the present invention.

(Concentration of Monomer Component)

An aqueous monomer solution is prepared by selecting various respective substances and respective components described above (hereinafter, may be described as "monomer component") depending on the purpose, defining respective amounts so as to satisfy the above-described range, and mixing the components. Incidentally, in the present invention, in addition to using the monomer in the form of an aqueous solution, the monomer can be used in the form of a mixed solution of water and a hydrophilic solvent.

Meanwhile, the total concentration of the monomer components is preferably 10% by mass or more, more preferably 20% by mass or more, even more preferably 30% by mass or more, preferably 80% by mass or less, more preferably 75% by mass or less, and even more preferably 70% by mass or less from the viewpoint of the physical properties of the water-absorbent resin. The concentration of the monomer component is calculated from Equation (1) below.

Concentration of monomer component (% by mass)= [mass of monomer component)/(mass of aqueous monomer solution)]×100    Equation (1)

Note that in Equation (1), "the mass of aqueous monomer solution" does not include the mass of graft component, water-absorbent resin, and hydrophobic organic solvent in the reverse phase suspension polymerization.

[2-2] Polymerization Step

This step is i) a step of polymerizing an aqueous monomer solution to obtain a hydrogel crosslinked polymer. Preferably, the step is a step of polymerizing an aqueous monomer solution containing a monomer containing acrylic acid (salt) as a main component and at least one type of polymerizable internal crosslinking agent obtained in the preparation step of the aqueous monomer solution to obtain a hydrogel crosslinked polymer (hereinafter, may be described as "hydrogel").

(Polymerization Initiator)

As the polymerization initiator used in the present invention, one or two or more types can be selected from polymerization initiators that are utilized in the normal production of the water-absorbent resin according to the type of monomer to be polymerized, the polymerization condition, or the like. Examples of the polymerization initiator include thermally degradable type polymerization initiators and photodegradable type polymerization initiators.

Examples of the thermally degradable type polymerization initiator include persulfates such as sodium persulfate, potassium persulfate, and ammonium persulfate; peroxides such as hydrogen peroxide, t-butyl peroxide, and methyl ethyl ketone peroxide; azo compounds such as azo nitrile compounds, azo amidine compounds, cyclic azo amidine compounds, azo amide compounds, alkyl azo compounds, 2,2'-azobis(2-amidinopropane)dihydrochloride, and 2,2'-azobis[2-(2-imidazolin-2-yl)propane]dihydrochloride.

Examples of the photodegradable type polymerization initiator include benzoin derivatives, benzyl derivatives, acetophenone derivatives, benzophenone derivatives, and azo compounds.

Among them, persulfates are preferable in consideration of cost and ability to reduce residual monomers. Further, a reducing agent which promotes degradation of an acidic polymerization initiator such as the persulfate or peroxide can be used in combination and combined, thus forming a redox initiator. Examples of the reducing agent include (bi)sulfite (salts) such as sodium sulfite, and sodium hydrogen sulfite; reducing metal (salts) such as L-ascorbic acid (salts), and ferrous salts; and amines.

The used amount of the polymerization initiator is preferably 0.001 mol % or more, more preferably 0.01 mol % or more, preferably 1 mol % or less, more preferably 0.5 mol % or less, and even more preferably 0.1 mol % or less relative to the amount of the monomer excluding the internal crosslinking agent. The used amount of the reducing agent is preferably 0.0001 mol % or more, more preferably 0.0005 mol % or more, preferably 0.02 mol % or less, and more preferably 0.015 mol % or less relative to the amount of the monomer excluding the internal crosslinking agent. When the used amount is within the range, a water absorbent resin having a desired water absorption performance can be obtained.

In addition, in the present invention, the polymerization reaction may be started by irradiation with active energy rays such as radiation rays, electron beams, and ultraviolet rays. Irradiation with active energy rays and the polymerization initiator may also be used in combination.

(Polymerization Form)

Examples of the polymerization form applied to the present invention include aqueous solution polymerization, reverse phase suspension polymerization, spray polymerization, droplet polymerization, bulk polymerization, and precipitation polymerization. Among them, preferably, aqueous solution polymerization or reverse phase suspension polymerization, more preferably, aqueous solution polymerization, or even more preferably, continuous aqueous solution polymerization is selected from the viewpoint of ease of controlling polymerization and the water absorption performance of the water-absorbent resin. The reverse phase suspension polymerization is described in, for example, WO 2007/004529, and WO 2012/023433. Further, the continuous aqueous solution polymerization enables production of the water-absorbing agent or water-absorbent resin with high productivity. Examples of the continuous aqueous solution polymerization include continuous belt polymerization described in U.S. Pat. Nos. 4,893,999, 6,906,159, 7,091,253, 7,741,400, 8,519,212, and JP-A-2005-36100, and the like, and continuous kneader polymerization described in U.S. Pat. No. 6,987,151 and the like.

A preferred form of the continuous aqueous solution polymerization include high-temperature initiation polymerization, high-concentration polymerization, and foaming polymerization The "high-temperature initiation polymerization" means a polymerization form in which the temperature of the aqueous monomer solution at the time of starting polymerization is set to preferably 35° C. or more, more preferably 40° C. or more, even more preferably 45° C. or more, particularly preferably 50° C. or more, and preferably the boiling point of the aqueous monomer solution or less. The "high-concentration polymerization" means a polymerization form in which the concentration of the monomer at the time of starting polymerization is set to preferably 30% by mass or more, more preferably 35% by mass or more, even more preferably 40% by mass or more, particularly preferably 45% by mass or more, and preferably the saturation concentration of the aqueous monomer solution or less. The "foaming polymerization" means a polymerization form that polymerizes the aqueous monomer solution containing a foaming agent or air bubbles. Meanwhile, one of these polymerization forms may be employed alone or two or more of these polymerization forms may be employed in combination.

Examples of a method of dispersing air bubbles in the foaming polymerization include a method of dispersing air bubbles by reducing the solubility of gas dissolved in the aqueous monomer solution; a method of introducing gas from the outside and dispersing the gas as air bubbles; and a method of causing foaming by adding a foaming agent to the aqueous monomer solution. A combination use of any of these dispersion methods may be appropriately employed in accordance with desired physical properties of the water-absorbent resin.

In a case where a gas is introduced from the outside, examples of the gas include oxygen, air, nitrogen, carbon dioxide gas, and ozone, as well as a mixed gas of these gases. From the viewpoint of polymerizability and cost, an inert gas such as nitrogen and carbon dioxide gas is preferably used, and nitrogen is more preferably used.

Examples of the foaming agent that can be used include an azo compound and an organic or inorganic carbonate solution, a dispersion, or a powder having a particle diameter of 0.1 μm or more and 1,000 μm or less of. Among them, inorganic carbonate is preferable, and specifically, carbonates such as sodium carbonate, ammonium carbonate, and magnesium carbonate; and bicarbonates can be used.

The gel crushing of the foam shaped hydrogel obtained by foaming polymerization facilitates drying. Further, the foam shaped water-absorbent resin can improve the water absorption rate of the water-absorbent resin and also facilitates immobilization in the absorbent article. The foam shape of the water-absorbent resin can be confirmed by, for example, pores having a diameter of 1 μm or more and 100 μm or less on the surface of particles observed by an electron microscope. The number of pores is preferably one or more, more preferably 10 or more, preferably 10,000 or less, and more preferably 1,000 or less per water-absorbent resin, and can be controlled by the foaming polymerization.

[2-3] Gel Crushing Step

This step is ii) a step of crushing the hydrogel crosslinked polymer (hereinafter, may be described as "polymer gel"), the step being performed in the middle of and/or after the polymerization step i). Specifically, the hydrogel may be crushed in the polymerization step, or the hydrogel may be crushed after the polymerization step. That is, this step is a step of gel crushing the hydrogel to obtain a particulate hydrogel (hereinafter, may be described as "particulate hydrogel" or "particulate polymer gel"). Incidentally, to distinguish from the "crushing" in the crushing step described later, the "crushing" in this step is described as the "gel crushing". In addition, a target of gel crushing includes not only the hydrogel (polymer gel) obtained in the polymerization step, but also a later-described "granulated gel (fine powder granulated gel)" obtained by recycling water-absorbent resin fine powder obtained after drying in some cases unless specifically noted otherwise. The same applies to other steps unless specifically noted otherwise.

The gel crushing refers to adjusting the size of the hydrogel to a predetermined size by using a screw extruder such as a kneader and a meat chopper, or a gel crusher such as a cutter mill.

In a case where the hydrogel is gel crushed, preferably hot water is preferably added to the gel crusher. This is because adding hot water can provide a particulate hydrogel having low adhesiveness and good gas permeability, and thus facilitates drying, which is preferable. The temperature of the hot water is preferably 40° C. or more, more preferably 50° C. or more, even more preferably 60° C. or more, and preferably 100° C. or less.

For the embodiments and operation conditions of gel crushing and the like, the contents described in WO 2011/126079 are preferably applied to the present invention. Note that, in a case where the polymerization form is kneader polymerization, the polymerization step and the gel crushing step are performed at the same time. In addition, by performing the gel crushing step in the present invention, a water-absorbent resin having an irregularly crushed shape can be obtained.

Further, the production method of the present invention includes a granulation step of mixing the fine powder removed in the fine powder recycling step and an aqueous liquid to obtain a granulated gel; and a granulated gel adding step of adding the granulated gel to the hydrogel crosslinked polymer in at least one step of and/or between steps after end of the gel crushing step to completion of drying in the drying step. In the gel crushing step of the present invention, in particular, in gel crushing in the second embodiment of the present invention, more preferably, gel crushing energy is suitably controlled. For the particulate hydrogel obtained by gel crushing with a predetermined level of gel crushing energy described below, even when a mixture of such a particulate hydrogel (polymer gel) and the granulated gel (fine powder granulated gel) is stacked in drying by a ventilation band type dryer, the mixture is less likely to be densely stacked. Therefore, it is possible to dry the mixture in very short time compared to the case where a granular hydrogel obtained by gel crushing under the normal condition. Further, such a granular hydrogel is easily mixed well with the granulated gel described later and easily dried uniformly. In addition, also in terms of the physical properties of the resulting water-absorbent resin, the evaluation of the water absorption rate, for example, the FSR disclosed in WO 2009/016055 or the vortex described in JIS K 7224 (1996 fiscal year) "Testing method for water absorption rate of water-absorbent resins" is improved.

Here, the "gel crushing energy" in the present invention refers to mechanical energy per unit mass required by a gel crushing apparatus when gel crushing the hydrogel, that is, mechanical energy per unit mass of hydrogel. This energy does not include the energy for heating or cooling a jacket or energy of water/steam to be introduced. Note that the "gel crushing energy" is abbreviated as "GGE". GGE is calculated by Equation (1) below in a case where the gel crushing apparatus is driven by three-phase alternating current power.

$$\text{GGE [J/g]} = \{\sqrt{3} \times \text{voltage} \times \text{current} \times \text{power factor} \times \text{motor efficiency}\} / \{\text{mass of hydrogel crosslinked polymer introduced into gel crusher for one second}\} \quad \text{Equation (1)}$$

In the equation, the "power factor" and the "motor efficiency" are values inherent to the gel crushing apparatus, vary depending on the operation condition and the like of the apparatus, and may have a value of 0 or more and 1 or less. It is possible to know these values by inquiring them from the manufacturer of the apparatus or the like. In a case where the gel crushing apparatus is driven by single-phase alternating current power, GGE can be calculated by changing "$\sqrt{3}$" in the equation to "1". Note that the unit of voltage is [V], the unit of current is [A], and the unit of weight (mass) of a hydrogel crosslinked polymer is [g/s].

The "power factor" and the "motor efficiency" in the GGE are values during gel crushing. Note that values of the power factor and motor efficiency during idling are approximately defined as in the equation because the current value during idling is small. The phrase "mass of hydrogel crosslinked polymer introduced into gel crusher for one second [g/s]" in Equation (1) refers to, for example, the value obtained by converting [t/hr] into [g/s] in a case where the hydrogel crosslinked polymer is continuously supplied by a quantitative feeder, and the supplied amount thereof is indicated as [t/hr]. Note that there may be a case where the hydrogel crosslinked polymer includes a recycled granulated gel which will be described later.

In the present invention, the gel crushing energy for gel crushing (GGE) is preferably 100 J/g or less, more preferably 80 J/g or less, even more preferably 60 J/g or less, preferably 20 J/g or more, more preferably 25 J/g or more, and even more preferably 30 J/g or more. By controlling the gel crushing energy (1) within the above-described range, gel crushing can be performed while applying appropriate shearing and compressive forces to the hydrogel.

Note that in a case where gel crushing is performed by use of a plurality of apparatuses such as use of a screw extruder after kneader polymerization or use of a plurality of screw extruders, the total of energies consumed in respective apparatuses is determined to be the gel crushing energy (GGE).

Further, in a case where the gel crushing energy is controlled as described above, more excellent effects can be obtained by combining with addition of hot water in the above-described range. After normal gel crushing, gel crushing based on the gel crushing energy may also be performed.

The particle diameter of the particulate hydrogel refined in the gel crushing step is preferably in a range of 0.1 mm or more and 10 mm or less from the viewpoint of ease of drying and the physical properties of the resulting water-absorbent resin. The mass average particle diameter (D50) of the particulate hydrogel is preferably 0.1 mm or more, preferably 5 mm or less, and more preferably 2 mm or less. Further, in the second embodiment of the present invention, that is, in a case where the gel crushing energy is applied, the mass average particle diameter (D50) of the particulate hydrogel is preferably 0.1 mm or more and 1.0 mm or less. When the mass average particle diameter (D50) of the particulate hydrogel is out of the above-described range, drying is not sufficiently performed in some cases. In the present invention, the mass average particle diameter of the hydrogel subjected to the drying step iii) is preferably within the above-described range, and more preferably, the above-described particle diameter and mass average particle diameter are both satisfied.

As the particle size of the particulate hydrogel, the logarithmic standard deviation ($\sigma\zeta$) indicating the narrow particle size distribution is preferably 0.2 or more, preferably 1.5 or less, more preferably 1.3 or less, and even more preferably 1.2 or less. In the logarithmic standard deviation ($\sigma\zeta$) of the particle size distribution, a smaller value indicates uniform particle diameter, which is advantageous in enabling uniform drying. However, in order to obtain a logarithmic standard deviation ($\sigma\zeta$) of the particle size distribution of less than 0.2, a special operation such as particle size control in the polymerization before gel crushing, classification of the particulate hydrogel after gel crushing, or the like is required. Thus, it is difficult to be substantially implemented from the viewpoint of productivity or cost.

Incidentally, in order to increase the specific surface area of the water-absorbent resin and water-absorbing agent described later, it is preferred to use the gel crushing method described in WO 2011/126079. Also, the gel crushing technique may also be combined with the foaming polymerization.

The measurement methods of the mass average particle diameter (D50) and the logarithmic standard deviation ($\sigma\zeta$) of the particle size distribution of the particulate hydrogel are performed by the methods described in WO 2011/126079.

Further, for uniform and efficient drying, the moisture content of the particulate hydrogel is preferably 30% by mass or more, more preferably 45% by mass or more, preferably 70% by mass or less, and more preferably 55% by mass or less.

[2-4] Drying Step

This step is iii) a step of drying the crushed hydrogel crosslinked polymer, specifically, a step of drying the particulate hydrogel or both the granulated gel and the particulate hydrogel in a case where the granulated gel (fine powder granulated gel) is further added to the particulate hydrogel, to a desired solid content to obtain a dried polymer. The solid content, that is, the value obtained by subtracting the moisture content from 100% by mass of the gel is preferably 80% by mass or more, more preferably 85% by mass or more, even more preferably 90% by mass or more, particularly preferably 92% by mass or more, preferably 99% by mass or less, even more preferably 98% by mass or less, and particularly preferably 97% by mass or less. When the solid content of the dried polymer is within the above-described range, crushing, classification, and surface crosslinking can be efficiently performed. Incidentally, in this drying step, particularly in a case where static drying such as drying by a ventilation band type dryer is employed, the dried polymer tends to be a block-like dried product due to aggregation during drying, and the moisture content is different among the upper portion, the lower portion, the center, and the edge of the block-like dried product in some cases. However, the moisture content may be determined by appropriately obtaining the dried polymer at various positions, crushing as necessary, measuring the moisture contents, and obtaining the average value thereof. Note that, in the present invention, the timing at which the granulated gel is added is defined as "until drying has been completed in the drying step iii)". The "completion of drying" refers to a state of being dried in a level regarded as a dried polymer. Specifically, the "completion of drying" refers to a state where the solid content reaches 80% by mass and has no relationship with the end of the drying step. In other words, at the time of completion of drying, that is, after the solid content reached 80% by mass, it is possible to further continue the drying step to achieve a preferred range of the solid content.

In the present invention, a dried polymer having a solid content less than the predetermined solid content is referred to as a non-dried product in some cases. Note that an "object to be dried" or "particulate hydrogel" in the drying step includes a case of including both the particulate hydrogel and the granulated gel in some cases. The drying step of the present invention provides a more effective condition particularly in the case of including the particulate hydrogel (polymer gel) and the granulated gel (fine powder granulated gel). Note that, similarly, in the other steps, there may be a case where the hydrogel and the treated product thereof include the granulated gel and the treated product thereof. As described above, the granulated gel (fine powder granulated) and particulate hydrogel (polymer gel) are different in their characteristics and drying efficiency. Therefore, it has been difficult to dry both gels together, but such a problem can be solved by the present invention.

Examples of the drying method in the drying step include heat drying, hot-air drying, drying under reduced pressure, fluidized bed drying, infrared drying, microwave drying, azeotropic dehydration drying with a hydrophobic organic solvent, high-humidity drying utilizing high-temperature water vapor, and stirring drying of drying while moving an object to be dried. Among them, stirring drying and hot-air drying are preferable from the viewpoint of drying efficiency. The stirring drying is preferably performed by a stirring dryer such as a paddle dryer or a rotary drum type dryer. The hot-air drying is preferably performed by a ventilation band type dryer which performs hot-air drying on a ventilation belt. Use of the ventilation band type dryer can achieve efficient drying while preventing generation of fine powder caused by physical damage or friction of the dried polymer and an object to be dried such as particulate hydrogel in the middle of drying, or the like.

The stirring drying is preferably performed by a rotary drum type dryer from the viewpoint of reducing mechanical damage on an object to be dried. From the viewpoint of reducing thermal and mechanical damage, the rotary drum type dryer is more preferably a rotary drum type dryer having one or two or more heating means selected from a ventilation heating type in direct heat transfer, and an outer wall heating type and a tubular heating type in indirect heat transfer. Further, in the case of heating with only the ventilation heating type, for example, a problem such as scattering of dried products due to ventilation and generation of a large amount of waste gas may occur. Accordingly, in the indirect heat transfer, one or two or more heating means selected from the outer wall heating type and the tubular heating type are preferable.

Further, the tubular heating type employs a plurality of heating tubes to increase the heating area in the interior of the dryer, and thus enables efficient drying, which is more preferable. Examples of such a rotary drum type dryer include a rotary drum type dryer equipped with heating tubes.

The rotary drum type dryer may include another fluidizing means for fluidizing the contents as long as an object of the present invention is not inhibited. Examples of the other fluidizing means include a scooping plate, a stirring blade, or the like provided in the interior of the rotating container.

The drying temperature in the present invention, that is, the temperature of the hot air is, in consideration of drying efficiency, preferably 120° C. or more, more preferably 130° C. or more, even more preferably 150° C. or more, preferably 250° C. or less, more preferably 230° C. or less, and even more preferably 200° C. or less. The drying time is preferably 10 minutes or more, more preferably 20 minutes or more, even more preferably 30 minutes or more, preferably 2 hours or less, more preferably 1.5 hours or less, and even more preferably 1 hour or less. When the drying temperature and the drying time are within the above-described range, the physical properties of the resulting water-absorbent resin can be made a desired range. Other drying conditions may be appropriately set according to the moisture content and total mass of the particulate hydrogel and granulated gel subjected to be dried, and a desired solid content. In the case of band drying, various conditions described in, for example, WO 2006/100300, WO 2011/025012, WO 2011/025013, and WO 2011/111657 are appropriately applied.

(Ventilation Band Type Dryer)

In a case where an object to be dried is dried by the ventilation band type dryer, the object to be dried is continuously supplied such that the object to be dried is a layer on the band of the band dryer (hereinafter, may be referred to as "gel layer") and dried by hot air. The width of the band of this dryer is preferably 0.5 m or more, more preferably 1 m or more, preferably 10 m or less, and more preferably 5 m or less. The length of the band is preferably 20 m or more, more preferably 40 m or more, preferably 100 m or less, and more preferably 50 m or less.

The moving speed of the object to be dried on the band may be appropriately set according to the belt width, belt length, production amount, drying time and the like. From the viewpoint of a load on the belt driving apparatus and durability of the apparatus or the like, the moving speed is preferably 0.3 m/min or more, more preferably 0.5 m/min or more, even more preferably 0.7 m/min or more, preferably 5 m/min or less, more preferably 2.5 m/min or less, even more preferably 2 m/min or less, and particularly preferably 1.5 m/min or less.

The average thickness of the gel layer of the object to be dried spread on the ventilation band type dryer is preferably 3 cm or more, more preferably 5 cm or more, even more preferably 8 cm or more, preferably 30 cm or less, more preferably 20 cm or less, and even more preferably 15 or less. In order to efficiently achieve the above-described solid content under the above-described condition, the thickness of the gel layer is desirably set to be the above-described range. Meanwhile, when the gel layer is too thick, remaining of a non-dried product or uneven drying tends to occur. Thus, even when the predetermined drying step is performed, the proportion of the dried polymer that does not satisfy the preferred solid content increases in some cases.

In the present invention, the thickness change ratio in the ventilation band type dryer, which can be determined from the following equation, is preferably 1.05 or more, more preferably 1.1 or more, preferably 3 or less, more preferably 2.5 or less, and even more preferably 2 or less. When the gel layer is dried on the ventilation belt by varying the thickness of the gel layer on the band in the width direction rather than making the thickness of the gel layer on the band uniform in the width direction, more even drying can be achieved, which is preferable. The thickness change ratio of the gel layer is the thickness in the cross section in the vertical direction with respect to the band traveling direction, and is the thickness of the polymer gel in the width direction as measured in a predetermined section in the travelling direction of the ventilation belt. That is, the thickness of the gel layer of the present invention is the thickness before drying is started on the ventilation belt, in other words, the thickness of an object to be dried until the solid concentration of the object to be dried raises. Note that the phrase "until the solid concentration raises" refers to until the solid concentration raises by preferably 1% by mass, more preferably 0.5% by mass, and even more preferably more than 0% by mass relative to the solid concentration of the object to be dried before drying.

Thickness change ratio=(maximum thickness in the width direction of an object to be dried/average thickness)

In the present invention, satisfying only one of the thickness of the gel layer and the thickness change ratio is also a preferred embodiment, but satisfying both is a more preferred embodiment.

In the present invention, it is preferred to further perform a thickness control operation on the object to be dried spread on the ventilation band type dryer. Drying failure caused by coarse aggregates and the like can be further suppressed by performing a thickness control operation to satisfy preferably the thickness of the gel layer, more preferably the thickness change ratio, and even more preferably the thickness of the gel layer and the thickness change ratio. The thickness control operation is not particularly limited as long as the thickness of the object to be dried on the band can be adjusted. Examples thereof include operations using a rake, a rotary type leveling machine, or the like.

[2-5] Crushing Step and Classifying Step

The crushing step is iv) a step of crushing the polymer after drying, and the classifying step is v) a step of removing fine powder from the crushed polymer. Specifically, the steps are a step of crushing the dried polymer obtained through the drying step in the crushing step and adjusting the particle size to a desired range in the classifying step to obtain a water-absorbent resin. By performing the crushing step after drying, a water-absorbent resin having an irregularly crushed shape can be obtained.

Examples of a crusher used in the crushing step include a high-speed rotary type crusher such as a roll mill, a hammer mill, a screw mill, and a pin mill, a vibrating mill, a knuckle type crusher, and a cylinder type mixer. Among them, a roll mill is preferably selected from the viewpoint of crushing efficiency. A plurality of these crushers can also be used in combination.

Examples of the method of adjusting the particle size in the classifying step include sieve classification using a JIS standard sieve (JIS Z8801-1 (2000)), and air-flow classification. Among them, a sieve classification is preferably selected from the viewpoint of classification efficiency. Note that, from the viewpoint of ease of crushing, the classifying step may be additionally performed before the crushing step.

For the particle size distribution of the water-absorbent resin, the mass average particle diameter (D50) is preferably 300 μm or more and 600 μm or less, and the proportion of the particles having a particle diameter of less than 150 μm is 5% by mass or less. The upper limit of the mass average particle diameter (D50) is more preferably 500 μm or less, even more preferably 450 μm or less, and particularly preferably 400 μm or less. Further, the proportion of the particles having a particle diameter of less than 150 μm is more preferably 4% by mass or less, even more preferably 3% by mass or less, and particularly preferably 2% by mass or less. Further, the logarithmic standard deviation ($\sigma\zeta$) indicating the narrow particle size distribution is preferably 0.20 or less, more preferably 0.25 or less, even more preferably 0.27 or more, preferably 0.50 or less, more preferably 0.40 or less, and even more preferably 0.35 or less. In the logarithmic standard deviation ($\sigma\zeta$) of the particle size distribution, a smaller value indicates uniform particle diameter, which is advantageous in reducing segregation of particles. Preferably, the mass average particle diameter (D50) and the proportion of the particles having a particle diameter of less than 150 μm are satisfied. More preferably, the mass average particle diameter (D50), the proportion of the particles having a particle diameter of less than 150 μm, and the logarithmic standard deviation are satisfied. They are appropriately combined in the respective ranges.

The above-described particle size is applied not only to the water-absorbent resin after the crushing step and the classifying step, but also to the water-absorbing agent as a final product. Thus, in the case of performing surface crosslinking, surface crosslinking treatment is performed in the surface crosslinking step such that the above-described range of particle size adjusted for the water-absorbent resin before surface crosslinking is preferably maintained. More preferably, the particle size is adjusted by providing a sizing step after the surface crosslinking step.

[2-6] Surface Crosslinking Step

This step is a step of further providing, as necessary, a portion having a high crosslinking density on the surface layer of the water-absorbent resin before surface crosslinking which is obtained through the above-described respective steps. The step includes a mixing step, a heat treatment step, and a cooling step, and the like. In the surface crosslinking step, radical crosslinking, surface polymerization, crosslinking reaction with a surface crosslinking agent, or the like occurs on the surface of the water-absorbent resin before surface crosslinking, and thus a surface-crosslinked water-absorbent resin is obtained.

[2-6-1] Mixing Step

This step is a step of mixing a solution containing a surface crosslinking agent (hereinafter described as "surface crosslinking solution") with a water-absorbent resin before surface crosslinking in a mixing apparatus to obtain a humidified mixture.

(Surface Crosslinking Agent)

In the present invention, a surface crosslinking agent is used during surface crosslinking. Specific examples of the surface crosslinking agent include the surface crosslinking agents described in U.S. Pat. No. 7,183,456. Among these surface crosslinking agents, at least one type of surface crosslinking agent is selected in consideration of the reactivity and the like. Further, preferably, an organic compound that is a surface crosslinking agent having two or more functional groups reacting with a carboxyl group and forms a covalent bond is selected from the viewpoint of the handleability of the surface crosslinking agent, the water absorption performance of the water-absorbent resin, and the like.

More specific examples of the surface crosslinking agent include polyhydric alcohol compounds such as ethylene glycol, diethylene glycol, triethylene glycol, tetraethylene glycol, polyethylene glycol, 1,3-propanediol, propylene glycol, 1,4-butanediol, 1,2-butanediol, 1,3-butanediol, 2,3-butanediol, 1,5-pentanediol, 1,4-pentanediol, 1,3-pentanediol, 1,2-pentanediol, 2,3-pentanediol, 2,4-pentanediol, dipropylene glycol, polypropylene glycol, glycerin, polyglycerine, 1,6-hexanediol, 1,5-hexanediol, 1,4-hexanediol, 1,3-hexanediol, 1,2-hexanediol, 2,3-hexanediol, 2,4-hexanediol, diethanolamine, and triethanolamine; polyvalent amine compounds such as ethylene diamine, diethylene triamine, triethylene tetramine, tetraethylene pentamine, pentaethylene hexamine, polyallylamine, and polyethyleneimine, haloepoxy compounds, condensates of a polyvalent amine compound and a haloepoxy compound, oxazoline compounds such as 1,2-ethylenebisoxazoline, oxazolidinone compounds, alkylene carbonate compounds such as 1,3-dioxolane-2-one (ethylenecarbonate), 4-methyl-1,3-dioxolane-2-one, 4,5-dimethyl-1,3-dioxolane-2-one, 4,4-dimethyl-1,3-dioxolane-2-one, 4-ethyl-1,3-dioxolane-2-one, 4-hydroxymethyl-1,3-dioxolane-2-one, 1,3-dioxane-2-one, 4-methyl-1,3-dioxane-2-one, 4,6-dimethyl-1,3-dioxane-2-one, and 1,3-dioxopan-2-one, polyvalent glycidyl compounds such as ethylene glycol diglycidyl ether, polyethylene diglycidyl ether, glycerol polyglycidyl ether, digylcerol polyglycidyl ether, polyglycerol polyglycidyl ether, propylene glycol diglycidyl ether, polypropylene glycol diglycidyl ether, and glycidol, oxetane compounds, vinyl ether compounds, and cyclic urea compounds.

The used amount of the surface crosslinking agent or the total amount of surface crosslinking agents when a plurality types of surface crosslinking agents are used is preferably 0.01 parts by mass or more, preferably 10 parts by mass or less, more preferably 5 parts by mass or less, and even more preferably 2 parts by mass or less relative to 100 parts by mass of the water-absorbent resin before surface crosslinking. When the used amount of the surface crosslinking agent is within the above-described range, an optimal crosslinking structure can be formed in the surface layer of the water-absorbent resin before surface crosslinking, resulting in a water absorbent resin having high physical properties.

Preferably, the surface crosslinking agent is added as an aqueous solution to the water-absorbent resin before surface crosslinking. In this case, the used amount of water is preferably 0.1 parts by mass or more, more preferably 0.3 parts by mass or more, even more preferably 0.5 parts by mass or more, preferably 20 parts by mass or less, more preferably 15 parts by mass or less, and even more preferably 10 parts by mass or less relative to 100 parts by mass of the water-absorbent resin before surface crosslinking. When the used amount of water is within the above-described range, the handleability of the surface crosslinking solution is improved, and thus the surface crosslinking agent can be uniformly mixed in the water-absorbent resin before surface crosslinking.

In addition, a hydrophilic organic solvent is used in combination with the water as necessary to obtain the surface crosslinking solution. In this case, the used amount of the hydrophilic organic solvent is preferably 5 parts by mass or less, more preferably 3 parts by mass or less, and even more preferably 1 part by mass or less relative to 100 parts by mass of the water-absorbent resin before surface crosslinking. Specific examples of the hydrophilic organic solvent include lower alcohols such as methyl alcohol; ketones such acetone; ethers such as dioxane; amides such as N,N-dimethylformamide; sulfoxides such as dimethyl sulfoxide; and polyhydric alcohols such as ethylene glycol. However, use of these hydrophilic organic solvents may cause unpleasant smell of a swollen gel which is a problem of the present invention. For this reason, it is preferable to limit the used amount of the hydrophilic organic solvent to a small amount as much as possible even in the case of using the hydrophilic organic solvents.

Further, various additives added in "[2-7] Additives and Adding Step of Additives" descried below can be added to the surface crosslinking solution in a range of 5 parts by mass or less, or can be separately added in the mixing step. (Mixing Method and Mixing Condition)

In the mixing of the water-absorbent resin before surface crosslinking and the surface crosslinking solution, a method of preparing the surface crosslinking solution in advance, and preferably, spraying or adding dropwise, more preferably, spraying the solution to the water-absorbent resin before surface crosslinking is selected.

A mixing apparatus for the mixing preferably has a torque required for uniformly and reliably mixing the water-absorbent resin before surface crosslinking and the surface crosslinking agent. The mixing apparatus is preferably a high-speed type stirring mixer, and more preferably a high-speed stirring type continuous mixer. Note that the rotation speed of the high-speed type stirring mixer is preferably 100 rpm or more, more preferably 300 rpm or more, preferably 10,000 rpm or less, and more preferably 2,000 rpm or less.

The temperature of the water-absorbent resin before surface crosslinking to be supplied in this step is preferably 35° C. or more, preferably 80° C. or less, more preferably 70° C. or less, and even more preferably 60° C. or less from the viewpoint of the mixability with the surface crosslinking solution and the aggregability of the humidified mixture. In addition, the mixing time is preferably 1 second or more, more preferably 5 seconds or more, preferably 1 hour or less, and more preferably 10 minutes or less.

[2-6-2] Heat Treatment Step

This step is a step of applying heat to the humidified mixture obtained in the mixing step to cause crosslinking reaction on the surface of the water-absorbent resin before surface crosslinking.

In the heat treatment of the humidified mixture, the humidified mixture may be heated in a static state, or may be heated in a fluidized state by using power of stirring or the like. It is preferred to heat the humidified mixture under stirring in terms of being capable of uniformly heating the entire humidified mixture. Examples of the heat treatment apparatus that performs the heat treatment include a paddle dryer, a multi-fin processor, and a towered dryer from the above-described viewpoints.

The heating temperature in this step is preferably 150° C. or more, more preferably 170° C. or more, even more preferably 180° C. or more, preferably 250° C. or less, and more preferably 230° C. or less from the viewpoint of the type and amount of the surface crosslinking agent, the water absorption performance of the water-absorbent resin, and the like. In addition, the heating time is preferably at least 5 minutes, and more preferably at least 7 minutes. By controlling the heating temperature and heating time within the above-described range, the water absorption performance of the resulting water-absorbent resin is improved, which is preferable.

[2-6-3] Cooling Step

This step is an optional step provided as necessary after the heat treatment step. This step is a step of forcibly cooling the high-temperature water-absorbent resin that has been subjected to the heat treatment step to a predetermined temperature to rapidly end surface crosslinking reaction.

The water-absorbent resin may be cooled in a static state, or may be cooled in a fluidized state by using power of stirring or the like. It is preferred to cool the water-absorbent resin under stirring in terms of being capable of uniformly cooling the entire water-absorbent resin. Examples of the cooling apparatus that performs cooling include a paddle dryer, a multi-fin processor, and a towered dryer from the above-described viewpoints. Note that these cooling apparatuses may have the same specification as that of the heat treatment apparatus used in the heat treatment step. This is because by changing a heat medium of the heat treatment apparatus to a refrigerant, the heat treatment apparatus can be used as a cooling apparatus.

The cooling temperature in this step may be appropriately set according to the heating temperature in the heat treatment step, the water absorption performance of the water-absorbent resin, and the like. The cooling temperature is preferably 40° C. or more, more preferably 50° C. or more, preferably 100° C. or less, more preferably 90° C. or less, and even more preferably 70° C. or less.

[2-7] Additives and Adding Step of Additives

[2-7-1] Surface Modifier

A surface modifier is an additive which is added to modify the particle surface of the water-absorbent resin. Specific examples thereof include a liquid permeability enhancer, an anti-caking agent under moisture absorption, a flow control agent of powder, and a binder of a water-absorbent resin. Particularly from the viewpoint of improving the liquid permeability, at least one type of compound selected from the group consisting of polyvalent metal salts, cationic polymers, and inorganic fine particles can be used, or two or more types of such compounds can be used in combination as necessary. The added amount of the surface modifier is appropriately set according to the compound to be selected. For the purpose of modifying the particle surface of the water-absorbent resin, the adding step of the surface modifier is performed preferably after the polymerization step, more preferably after the drying step, even more preferably after the surface crosslinking step. The addition of the surface modifier can also be performed in optional one or more steps.

(Polyvalent Metal Salt)

In a case where a polyvalent metal salt is used, the polyvalent metal cation of the polyvalent metal salt is preferably divalent or more, more preferably divalent or more and tetravalent or less, and even more preferably trivalent or tetravalent. Examples of polyvalent metal that can be used include aluminum and zirconium. Thus, examples of the polyvalent metal salt that can be used in this step include aluminum lactate, zirconium lactate, aluminum sulfate, and zirconium sulfate. Among them, aluminum lactate or aluminum sulfate is more preferable, and aluminum sulfate is even more preferable from the viewpoint of the effect of improving SFC.

The added amount of the polyvalent metal salt is preferably 0 mol or more, preferably less than $3.6 \times 10^{-5}$ mol, more preferably less than $1.4 \times 10^{-5}$ mol, and even more preferably less than $1.0 \times 10^{-5}$ mol relative to 1 g of the water-absorbent resin.

Further, a solution containing the polyvalent metal may further contain, as an agent for adjusting the permeability of the polyvalent metal to the water-absorbent resin, a monovalent metal compound such as sodium hydroxide, sodium carbonate, sodium hydrogen carbonate, sodium acetate, and sodium lactate.

(Cationic Polymer)

In a case where a cationic polymer is used, examples of the cationic polymer include the substances described in U.S. Pat. No. 7,098,284. Among them, a vinyl amine polymer is more preferable from the viewpoint of improving the liquid permeability. Further, the mass average molecular weight of the cationic polymer is preferably 5,000 or more and 1,000,000 or less.

The cationic polymer may be added so as to be preferably 0 parts by mass or more, more preferably more than 0 parts by mass, preferably less than 2.5 parts by mass, more preferably less than 2.0 parts by mass, and even more preferably less than 1.0 part by mass relative to 100 parts by mass of the water-absorbent resin.

(Inorganic Fine Particles)

In a case where inorganic fine particles are used, examples of the inorganic fine particles include the substances described in U.S. Pat. No. 7,638,570. Among them, silicon dioxide is preferable from the viewpoint of improving the liquid permeability.

In a case where the primary particle diameter of the inorganic fine particle is less than 20 nm, the inorganic fine particles may be added so as to be preferably 0 parts by mass or more, more preferably more than 0 parts by mass, preferably less than 1.2 parts by mass, more preferably less than 1.0 part by mass, and even more preferably less than 0.5 parts by mass relative to 100 parts by mass of the water-absorbent resin. Also, in a case where the primary particle diameter is 20 nm or more, the inorganic fine particles may be added so as to be preferably 0 parts by mass or more, more preferably more than 0 parts by mass, preferably less than 2.0 parts by mass, more preferably less than 1.5 parts by mass, and even more preferably less than 1.0 part by mass relative to 100 parts by mass of the water-absorbent resin.

[2-7-2] Other Additives

Examples of the other additives include chelate agents, reducing agents, hydroxycarboxylic acid compounds, surfactants, compounds having a phosphorus atom, oxidizing agents, organic powders such as metal soap, deodorants, anti-bacterial agents, pulp or thermoplastic fibers, aromatic substances such as a terpene aromatic compound and a phenol aromatic compound. One or two or more of these substances can be used. As the other additives, preferably, a chelate agent, and more preferably, amino polyvalent carboxylic acid or amino polyvalent phosphoric acid is preferable. Typical examples thereof include the chelate agents described in JP-A-11-060975, WO 2007/004529, WO 2011/126079, WO 2012/023433, JP-T-2009-509722, JP-A-2005-097519, JP-A-2011-074401, JP-A-2013-076073, JP-A-2013-213083, JP-A-59-105448, JP-A-60-158861, JP-A-11-241030, and JP-A-2-41155.

The other additives, preferably a chelate agent is added or contained in a range of preferably 0.001% by mass or more and 1% by mass or less relative to the amount of the monomer or the water-absorbent resin.

The additive can be added before, after, or in the middle of the above-described respective steps, that is, at least one step selected from the preparation step of an aqueous monomer solution, the polymerization step, the gel crushing step, the drying step, the crushing step, the classifying step, and the surface crosslinking step. Preferably, the additive is added before, after, or in the middle of any of the steps after the polymerization step.

[2-7-3] Adding Step of Additives

In the case of adding the additive to the water absorbent resin, when the additive is an aqueous medium solution such as liquid or water, it is preferred that the liquid or solution is sprayed to the water-absorbent resin, and the water absorbent resin and the additive are uniformly and reliably mixed while applying a sufficient amount of torque. Meanwhile, in the case where the additive is solid such as powder, the additive may be dry-blended with the water-absorbent resin, or an aqueous liquid such as water may also be used as a binder.

Specific examples of an apparatus used for the mixing include a stirring type mixer, a cylinder type mixer, a double-walled conical mixer, a V-shaped mixer, a ribbon type mixer, a screw type mixer, a fluidized rotary disk type mixer, an air stream type mixer, a dual-arm type kneader, an internal mixer, a crushing type kneader, a rotary type mixer, and a screw type extruder. Note that, in the case of using a stirring type mixer, the rotation speed thereof is preferably 5 rpm or more, more preferably 10 rpm or more, preferably 10,000 rpm or less, and more preferably 2,000 rpm or less.

[2-8] Sizing Step

In the present invention, a sizing step can be performed as necessary in addition to the steps described above. The sizing step is a step of adjusting the particle size of the water-absorbent resin after surface crosslinking obtained through the surface crosslinking step to a desired range to obtain a water-absorbent resin in a state that can be shipped as a final product, that is, a water-absorbing agent. However, in a case where the crushing step and the classifying step are not performed before the surface crosslinking step, the operation after the surface crosslinking step, which will be described later, is the crushing step and the classifying step. As the method of preparing the particle size in the sizing step, the same preparation method as in the classifying step can be employed. Further, in a case where the water-absorbent resin aggregates in the surface crosslinking step or the adding step of the surface modifier, disintegration, for example, slight crushing may be performed. In addition, the particle size distribution after particle size adjustment can be appropriately adjusted according to application, the particle size distribution is preferably the same level of that of the classifying step. It is therefore required that classification with a sieve or the like is performed so as to satisfy a desired mass average particle diameter (D50), proportion of the mass average particle diameter (D50), logarithmic standard deviation, and the like.

[2-9] Fine Powder Recycling Step

The fine powder recycling step is vi) a step of recycling the fine powder (water-absorbent resin fine powder), which has been subjected to the polymerization step and the drying step, and removed in the classifying step v), before completion of drying in the drying step iii). Here, completion of drying refers to drying until the solid content reaches 80% by mass. The fine powder to be recycled is preferably fine powder that has been removed in the classifying step, and more preferably fine powder that has been removed in the classifying step, the sizing step, and the like. Note that the fine powder is not required to be recycled to a production process of a water-absorbent resin which is strictly the same as the production process of the water-absorbent resin from which the fine powder is obtained. The fine powder may be recycled to a production process of another water-absorbent resin different in a level that does not impair the gist of the present invention. For example, fine powder produced in a certain production line may be recycled to an adjacent production line, or fine powder is removed in the same production line and then the polymerization condition or the like may be changed before recycling.

In a first embodiment of the present invention, the fine powder recycling step includes:
vi-1) a granulation step of mixing the removed fine powder and an aqueous liquid to obtain a granulated gel;
vi-2) a granulated gel adding step of adding the granulated gel to the hydrogel crosslinked polymer in at least one step of and/or between steps i) to iii) until completion of drying in the drying step iii); and
vi-3) a gel mixing step of mechanically mixing the hydrogel crosslinked polymer and the added granulated gel in at least one step of and/or between steps from the granulated gel adding step to completion of drying in the drying step iii). Desirably, the solid content of the granulated gel in the granulated gel adding step described later is a predetermined amount, and the temperatures of the granulated gel and hydrogel are within a predetermined range.

[2-9-1] Granulation Step

The granulation step is vi-1) a step of mixing the removed fine powder and an aqueous liquid to obtain a granulated gel. The granulated gel is a gel in which a plurality of gathered individual particles aggregate or fuse to be a large particle when observing by an optical microscope. The granulated gel preferably has a strength enough not to be broken due to classification operation or transport operation.

(Fine Powder)

In the present invention, although all the fine powders obtained in the production of the water-absorbent resin are included as a target for granulation, an aqueous liquid is added to fine powder removed preferably in the classifying step, more preferably in the classifying step and the sizing step to perform granulation. The mixing ratio (mass ratio) of fine powder removed in the classifying step and fine powder removed in the sizing step is preferably 99:1 to 50:50, more preferably 98:2 to 60:40, and even more preferably 95:5 to 70:30. The fine powder removed in the sizing step has been subjected to the surface crosslinking step, or in some cases, subjected to the adding step of the surface modifier described in [2-7-1] Surface Modifier in addition to the surface crosslinking step. Therefore, when a predetermined ratio of such a fine powder is contained in the granulation step, the aggregability of the granulated gel is reduced, which is advantageous. Further, in the present invention, for example, fine powder removed with a back filter or the like in respective production steps can be used for granulation. Further, fine powder obtained by removing in different steps or fine powders obtained by removing in another production process (another production apparatus) can be mixed and used. In addition, the fine powder may have the same composition as that of the hydrogel dried together, or may have a different composition. Preferably, a fine powder having the same composition derived from a hydrogel in which the fine powder is dried together is used.

The size of the fine powder used for granulation is preferably less than the size of the final product of the water-absorbent resin. For example, the mass average particle diameter (D50) defined in JIS standard sieve classification of the fine powder is preferably 150 μm or less, and more preferably 106 μm or less. The lower limit of the fine powder is preferably 38 μm or more, and more preferably 45 μm or more. Although the fine powder is targeted in this step, but even aggregates with a size exceeding the size of the final product can be appropriately crushed and used for granulation as the fine powder. The fine powder desirably contains particles having a particle diameter defined in JIS standard sieve classification of less than 150 μm in an amount of preferably 50% by mass or more, more preferably 70% by mass or more, even more preferably 90% by mass or more, and preferably 100% by mass or less. Also, the shape of the fine powder is preferably an irregular shape obtained by aqueous solution polymerization rather than a spherical shape obtained by the reverse phase suspension polymerization in terms of granulation strength. Further, as described above, the fine powder may be fine powder removed after the surface crosslinking step which is typically performed in the production of the water-absorbent resin, fine powder removed before the surface crosslinking step, or a mixture thereof.

An aqueous liquid is added to the fine powder, preferably a fine powder mixture obtained by mixing the fine powders (fine powder before surface crosslinking and fine powder after surface crosslinking) at a predetermined ratio to obtain a granulated gel (fine powder granulated gel). In the granulated gel, fine powders having various particle diameters obtained from the single step or a plurality of steps are used. The number average particle diameter of the granulated gel is preferably 0.15 mm or more, more preferably 0.2 mm or more, even more preferably 0.3 mm or more, preferably 20 mm or less, more preferably 5 mm or less, and even more preferably 2 mm or less. Note that the number average particle diameter of the granulated gel is determined by measuring the particle diameters of randomly selected 10 or more and 100 or less of the granulated gels. In a case where the granulated gel aggregates, the granulated gel is disintegrated into individual particles and then measured. In a case where a large gel-like product having a size exceeding the above-described range is obtained by mixing the fine powder and the aqueous liquid in the granulation step, the large gel-like product is preferably removed by crushing or classification means such as a sieve. The removed large gel-like product can also be reused by drying and crushing as necessary.

The temperature of the fine powder when mixing with the aqueous liquid is preferably 40° C. or more, preferably 50° C. or more, more preferably 60° C. or more, preferably 120° C. or less, more preferably 100° C. or less, and even more preferably 90° C. or less. By increasing the temperature of the fine powder, the mixability of the fine powder and aqueous liquid is improved, and thus a desired granulated gel is easily obtained. On the other hand, when the temperature of the fine powder is too high, heating cost becomes high. The temperature of the fine powder can be appropriately adjusted as necessary by heating from the outside such as hot air, temperature retention after heating in the drying step, or cooling by air blow at room temperature or the like. Preferably, the fine powder is heated or kept warm in a container equipped with a heating means such as a steam tracing or the like.

(Aqueous Liquid)

Specific examples of the aqueous liquid that is used for mixing with the fine powder include aqueous solutions containing water, lower alcohols such as methyl alcohol, ethyl alcohol, n-propyl alcohol, isopropyl alcohol, n-butyl alcohol, isobutyl alcohol, and t-butyl alcohol; ketones such as acetone; dioxane, ethers such as tetrahydrofuran; amides such as N,N-dimethylformamide; and sulfoxides such as dimethylsulfoxide. In view of the physical properties and granulation strength, a range of preferably 90% by mass or more, more preferably 99% by mass or more, and preferably 100% by mass or less of the aqueous liquid is preferably water. The aqueous liquid is particularly preferably only composed of water. The aqueous liquid can also contain a small amount of other additives such as a crosslinking agent, a chelate agent, a surfactant, a polymerization initiator, an oxidizing agent, and a reducing agent in a range that does not impair the effect of the present invention. One or two or more types of additives may be added. When two or more types of additives are added, the difference in type of additive does not have to be considered. For example, by using an aqueous liquid to which the polymerization initiator or reducing agent described in the polymerization step are added, residual monomers of the granulated gel and the hydrogel can be reduced. A preferred polymerization initiator is persulfates, and a preferred reducing agent is (bi)sulfite (salts). For example, by using an aqueous liquid to which an oxidizing agent is added, deterioration of the physical properties such as water absorption capacity when drying the granulated gel can be suppressed in some cases. A preferred oxidizing agent is at least one selected from chlorites, hypochlorites, and peroxides, and more preferably hydrogen peroxide. For example, by using an aqueous liquid to which a surfactant is added, a surfactant or a polymer dispersant can be contained in the granulated gel, thus enabling effective suppressing of aggregation of the granulated gels.

As the surfactant, surfactants such as an anionic surfactant, a nonionic surfactant, a cationic surfactant, and an amphoteric surfactant are exemplified, and further, a non-polymer surfactant is exemplified.

Specific examples of the anionic surfactant include fatty acid salts such as a mixed fatty acid sodium soap, a semi-hardened beef tallow fatty acid sodium soap, a sodium stearate soap, a potassium oleate soap, and a castor oil potassium soap; alkyl sulfate ester salts such as sodium lauryl sulfate, sodium higher alcohol sulfate, and triethanolamine lauryl sulfate; alkylbenzenesulfonic acid salts such as sodium dodecylbenzenesulfonate; alkylnaphthalene sulfonic acid salts such as sodium alkyl naphthalene sulfonate; alkylsulfosuccinic acid salts such as sodium dialkyl sulfosuccinate; alkyl diphenyl ether disulfonic acid salts such as sodium alkyl diphenyl ether disulfonate; alkyl phosphates such as potassium alkyl phosphate; polyoxyalkylene alkyl (or alkyl allyl) sulfate ester salts such as sodium polyoxyethylene lauryl ether sulfate, sodium polyoxyethylene alkyl ether sulfate, triethanolamine polyoxyethylene alkyl ether sulfate, and sodium polyoxyethylene alkylphenylether sulfate; special reaction type anionic surfactants; special carboxylic acid surfactants; naphthalenesulfonic acid formalin condensates such as sodium salts of a β-naphthalenesulfonic acid formalin condensate, and sodium salts of special aromatic sulfonic acid formalin condensate; special polycarboxylic acid polymer surfactants; and polyoxyethylene alkyl phosphate esters.

Specific examples of the nonionic surfactant include polyolefin oxides such as polyethylene glycol, polypropylene glycol, and a polyethylene glycol-polypropylene glycol block copolymer; polyoxyethylene alkyl ethers such as polyoxyethylene lauryl ether, polyoxyethylene cetyl ether, polyoxyethylene stearyl ether, polyoxyethylene oleyl ether, and polyoxyethylene higher alcohol ethers; polyoxyethylene alkyl aryl ethers such as polyoxyethylene nonyl phenyl ether; polyoxyethylene derivatives; sorbitan fatty acid esters such as sorbitan monolaurate, sorbitan monopalmitate, sorbitan monostearate, sorbitan tristearate, sorbitan monooleate, sorbitan trioleate, sorbitan sesquioleate, and sorbitan distearate; polyoxyethylene sorbitan fatty acid esters such as polyoxyethylene sorbitan monolaurate, polyoxyethylene sorbitan monopalmitate, polyoxyethylene sorbitan monostearate, polyoxyethylene sorbitan tristearate, polyoxyethylene sorbitan monooleate, and polyoxyethylene sorbitantrioleate; polyoxyethylene sorbitol fatty acid esters such as polyoxyethylene sorbite tetraoleate; glycerin fatty acid esters such as glycerol monostearate, glycerol monooleate, and self-emulsifying glycerol monostearate; polyoxyethylene fatty acid esters such as polyethylene glycol monolaurate, polyethylene glycol monostearate, polyethylene glycol distearate, and polyethylene glycol monooleate; polyoxyethylene alkylamines; polyoxyethylene hardened castor oils; and alkyl alkanolamides.

Examples of the cationic surfactant and the amphoteric surfactant include alkylamine salts such as coconut amine acetate, and stearyl amine acetate; quaternary ammonium salts such as lauryltrimethylammonium chloride, stearyltrimethylammonium chloride, cetyltrimethylammonium chloride, distearyldimethylammonium chloride, and alkylbenzyl dimethyl ammonium chloride; alkyl betaines such as lauryl betaine, stearyl betaine, and lauryl carboxymethyl hydroxyethyl imidazolinium betaine; and amine oxides such as lauryl dimethylamine oxide.

In addition to the surfactant, a fluorine-based surfactant or a siloxane-based surfactant can be further used.

A polymer dispersant can also be used. Here, examples of the polymer lubricant include maleic anhydride-modified polyethylene, maleic anhydride-modified polypropylene, a maleic anhydride-modified ethylene-propylene copolymer, a maleic anhydride-modified ethylene-propylene-diene terpolymer (EPDM), maleic anhydride-modified polybutadiene, a maleic anhydride-ethylene copolymer, a maleic anhydride-propylene copolymer, a maleic anhydride-ethylene-propylene copolymer, a maleic anhydride-butadiene copolymer, polyethylene, polypropylene, an ethylene-propylene copolymer, oxidized polyethylene, oxidized polypropylene, an oxidized ethylene-propylene copolymer, an ethylene-acrylic acid copolymer, ethyl cellulose, ethyl hydroxyethyl cellulose, and polyalkylene oxides such as polyethylene glycol. The weight average molecular weight of these substances is appropriately selected in a range of preferably 200 to 2,000,000, and more preferably 400 to 1,000,000.

The total content of the additives such as a surfactant in the aqueous liquid is preferably 0.0001% by mass or more and 0.5% by mass or less relative to the amount of the fine powder. When the content is less than 0.0001% by mass, a desired effect provided by the additive, such as suppressing aggregate of the granulated gel or the like cannot be obtained in some cases. On the other hand, when the additive is excessively added, there may be an adverse effect on the physical properties of final water-absorbent resin.

Note that in a case where the fine powder contains additives such as the crosslinking agent, chelate agent, surfactant, polymerization initiator, oxidizing agent, and reducing agent described above, the additive need not be added to the aqueous liquid, or the additive may be added only in an amount to cover the shortage. In particular, the fine powder preferably contains the chelate agent, surfactant, oxidizing agent, reducing agent, and the like described in the section of the adding step of the additives.

In a case where the additive such as a surfactant is used, the surface tension of the granulated gel is deteriorated in some cases. When the surface tension is excessively low, there is an adverse effect on the physical properties such as increase in the amount of re-wet of liquid absorbed in the water-absorbent resin when the water-absorbent resin is used as a product. Thus, it is preferable to control the surface tension of the granulated gel so that variation in the physical properties does not occur even when the granulated gel is reused. The surface tension of the extract extracted from the granulated gel, which contains a surfactant and is obtained by mixing the fine powder and aqueous liquid, with a 0.9% by mass sodium chloride aqueous solution (hereinafter, referred to as "extract") is preferably 65 mN/m or more, more preferably 68 mN/m or more, and even more preferably 70 mN/m or more. The surface tension of the granulated gel can be appropriately controlled according to the type of surfactant, the added amount of the fine powder, the physical properties of the granulated gel, and the production condition. For example, the surface tension of the granulated gel may be adjusted by the presence or absence of the surfactant, or by using a plurality of aqueous liquids having a different content of the surfactant. Preferably, an extract extracted from the granulated gel, which is obtained by adding a surfactant before, in the middle of, or after one step selected from the polymerization step, the gel crushing step, the drying step, the crushing step, and the classifying step, and/or allowing a surfactant to be contained in an aqueous liquid and mixing the fine powder and the aqueous liquid in the granulation step, has the above-described surface tension.

In a case where the aqueous liquid is added a plurality of times, in order to obtain a granulated gel having a high granulation strength in the first addition of the aqueous liquid, an aqueous liquid containing no surfactant or an aqueous liquid containing a small amount of surfactant is preferably added such that the surface tension of the extract extracted from the granulated gel obtained by mixing the aqueous liquid added in the first time and the fine powder is preferably 70 mN/m or more. Further, in order to prevent the granulated gel obtained by the first addition of the aqueous liquid from becoming a large aggregate, the second and later addition of the aqueous liquid is preferably performed such that at least one time addition of aqueous liquid out of the aqueous liquids of the second and later addition contains a surfactant, and the surface tension of the extract extracted from the granulated gel obtained by mixing the aqueous liquid containing the surfactant is 60 mN/m or more. A preferred range of the surface tension of the extract of the granulated gel obtained by the first mixing and the surface tension of the extract of the granulated gel obtained in the first mixing are more preferably 71 mN/m or more. It is preferred to appropriately add a surfactant such that the surface tension of the extract extracted from the obtained granulated gel is preferably in the above-described range. Preferably, the aqueous liquid is added a plurality of times in the granulation step.

Note that the surface tension of the granulated gel is the value obtained by measuring an extract extracted from a granulated gel obtained by mixing fine powder and an aqueous liquid containing a surfactant material with a 0.9% by mass sodium chloride aqueous solution. Specifically, a 0.9% by mass sodium chloride aqueous solution, for example, 50 ml of a saline solution that is temperature-regulated at 23° C. or more and 25° C. or less is introduced into a beaker which is sufficiently washed and has a capacity of 100 ml. Then, the surface tension of the saline solution is measured by using a surface tension meter (manufactured by KRUSS; K11 automatic surface tension meter). A saline solution is used in which the measurement value of the surface tension is within a range of 71 mN/m or more and 75 mN/m or less. Subsequently, a fluororesin rotor which has a length of 25 mm and is sufficiently washed, and 0.5 g of a granulated gel were introduced into the saline solution, and the content was stirred at 500 rpm for 4 minutes. Thereafter, stirring is stopped to cause the granulated gel to precipitate. The value obtained by measuring the supernatant in the same manner as described above is used as the value of the surface tension.

In a case where granulation is performed by mixing the fine powder and aqueous liquid, it is preferred to use an aqueous liquid heated in advance. By using a heated aqueous liquid, fine powder can be uniformly granulated in short time, and thus the productivity is improved. The temperature of the aqueous liquid is normally from the melting point to the boiling point, further, 10° C. or more, 20° C. or more, 30°

C. or more, preferably in this order, more preferably 40° C. or more, even more preferably 50° C. or more, still even more preferably 60° C. or more, particularly preferably 70° C. or more, preferably the boiling point of the aqueous liquid or less, and more preferably 100° C. or less. Note that the boiling point can be adjusted by, for example, addition of a salt and a solvent, and pressure such as pressure reduction or pressurization. In addition, as another method, the temperature may be controlled to substantially the above-described temperature by adding water vapor and an aqueous liquid at normal temperature at the same time.

The added amount of the aqueous liquid is preferably less than 100 parts by mass, more preferably 80 parts by mass or less, even more preferably 50 parts by mass or less, preferably 10 parts by mass or more, more preferably 15 parts by mass or more, and even more preferably 20 parts by mass or more relative to 100 parts by mass (as-is basis) of the fine powder. Here, the expression "as-is basis" simply refers to the mass of fine powder as is. Even when a slight amount of other components (for example, water and inorganic fine particles serving as a raw material of the water-absorbent resin) is contained in the fine powder of the water-absorbent resin, the slight amount of the components is not corrected from the weight of the fine powder. The mass measured for the entire fine powder is used as it is for the mass of the fine powder. In a case where the added amount of the aqueous liquid is 100 parts by mass or more, the drying load increases. Meanwhile, in a case where the added amount of the aqueous liquid is less than 10 parts by mass, the granulation strength is insufficient and mixing of the fine powder is not uniform, thus causing braking of granulated products in some cases.

(Mixing Apparatus)

In the present invention, a mixing apparatus used for mixing the aqueous liquid and fine powder in the embodiments is not particularly limited. For example, in a fixed container type mixer, a mechanical stirring type mixer is preferable. Specific examples of the mechanical stirring mixer include a turbulizer (manufactured by Hosokawa Micron Corp.), a Lodige mixer (manufactured by Lodige Co., Ltd.), and a mortar mixer (manufactured by Nishinihon Shikenki Co., Ltd.). Either a batch type mixer or a continuous type mixer may be used for mixing.

In the present invention, preferably, a heated aqueous liquid and a heated fine powder is mixed in the mixing apparatus. More preferably, the interior of the mixing apparatus, specifically, the wall surface and/or stirring means such as a stirring vane of the mixing apparatus are heated in addition to heating the aqueous liquid and fine powder. As described above, when mixing is performed in a state in which the interior of the mixing apparatus, aqueous liquid, and fine powder are all heated to a predetermined temperature, the production of the large gel-like product is suppressed more efficiently and a granulated gel having a desired particle diameter can be easily obtained. In the present invention, such an effect can be obtained when all of the fine powder, aqueous liquid, and mixing apparatus are not heated. However, heating preferably at least one, more preferably two, or even more preferably all of them to a predetermined temperature can provide more excellent effects.

The heating temperature of the interior of the mixing apparatus during mixing, preferably, the inner wall of the mixing apparatus and/or stirring means is preferably 50° C. or more, more preferably 55° C. or more, even more preferably 60° C. or more, particularly preferably 65° C. or more, most preferably 70° C. or more, preferably 120° C. or less, more preferably 100° C. or less, and even more preferably 90° C. or less. By heating the mixing apparatus, preferably, either of the inner wall or stirring means, more preferably, both the inner wall and stirring means, the fine powder can be uniformly granulated in short time, and thus the productivity is improved. The temperature inside the mixing apparatus can be appropriately adjusted, for example, by supplying heated gas and conductive electric heat or the like.

In the present invention, when the fine powder and aqueous liquid are mixed, it is preferred to perform granulation by high-speed mixing. High-speed mixing can suppress the production of the large gel-like product and thus eliminates a large mixing power required when the large gel-like product is produced. High-speed mixing can also prevent a problem that gel-like masses are mixed and kneaded to cause breaking or tangling of the main chain or the like, resulting in deterioration of the water-absorbent resin.

The high-speed mixing means that, in the mixing apparatus, the time from contact of the fine powder and aqueous liquid as a raw material to the production of the granulated gel is short. That is, the high speed mixing means that the time from introducing the raw material into the mixing apparatus to taking out of the granulated gel is short. The mixing time is preferably 3 minutes or less, more preferably 1 minute or less, preferably 1 second or more, and more preferably 5 seconds or more. When the mixing time is long, uniform mixing of the aqueous liquid and fine powder becomes difficult, which tends to result in an integrated large gel-like product. Further, the long mixing time causes deterioration of the performances of the water-absorbent resin such as increase in the water-soluble component of the resulting water-absorbent resin and decrease in the water absorption capacity under pressure in some cases.

Accordingly, as a means for achieving high-speed mixing, it is desirable to introduce the raw material into the mixing apparatus in short time. When time taken for introducing either one or both of the raw materials is long due to gradual addition by the method such as spraying the aqueous liquid, the mixing time also becomes long. This may cause large aggregate masses of the fine powder or cause deterioration of the water absorbent resin due to long time kneading. The fine powder and aqueous liquid may be introduced into the mixing apparatus at the same time. Alternatively, after introducing one of the fine powder and aqueous liquid, the other one may be introduced at different timing. Accordingly, the time period from the start to end of the introduction of both raw materials in a case of introducing raw materials at the same time, or the time period from the start to end of the introduction of the raw material to be introduced later in the case of introducing raw materials at different timings is preferably 60 seconds or less, more preferably 30 seconds or less, and even more preferably 10 seconds or less.

Further, for achieving high-speed mixing, it is preferred to use a high-speed stirring paddle mixer. The paddle rotation speed at this time is preferably 100 rpm or more, more preferably 200 rpm or more, even more preferably 300 rpm or more, preferably 5,000 rpm or less, more preferably 4,000 rpm or less, and even more preferably 3,000 rpm or less. The direction of the paddle rotating shaft is not limited, but the vertical direction is preferable in view of ease of discharging the granulated gel. The number of paddle rotating shafts is not limited, but one shaft or two shafts are preferable for ease of maintenance, and one shaft is more preferable.

In the present invention, for preventing attachment, it is preferred to use a material having a contact angle with water of 90 degrees or more for the inner wall of the mixer. A preferable material is fluororesin such as Teflon (registered trademark). Note that it is not necessary to use the above-described material for all of the inner wall. For obtaining a strong stirring force, a material having a contact angle with water of less than 90 degrees may be intentionally used for the inner wall around the paddle. A preferred material is stainless from the viewpoint of durability.

(Transport Step)

The respective production steps of the water-absorbent resin are preferably connected. Although all the connections of the steps do not necessarily require the transport step, for example, when the granulated gel obtained in the granulation step is recycled, the production process can include a step of transporting the granulated gel to a predetermined position for adding.

Transportation of the granulated gel is performed in a continuous manner or a batch manner, and is preferably performed in a continuous manner. Examples of the transport machine used in the transport step include a bucket conveyor, a belt conveyor, a screw conveyor, a chain conveyor, a vibrating conveyor, and a pneumatic conveyor, and a bucket conveyor is preferable. It is preferred that the granulated gel to be transported from outside of the transport machine is heated and/or kept warm to maintain the temperature of the granulated gel at high temperature even during transportation. Such a heating and/or temperature retention can be achieved by providing a means for heating and/or keeping warm the inner wall surface of the transport machine from the outside. When the temperature of the granulated gel (fine powder granulated gel) during transportation is lowered, the granulated gels are adhered to each other to be a coarse aggregate until the granulated gel hydrogel (polymer gel) are mixed. In addition, for example, when the temperature of the granulated gel is reduced, the granulated gel becomes hard. These coarse aggregates or hardened gel causes uneven drying in the drying step and thus a non-dried product tends to be generated. Generation of the non-dried product in the drying step tends to cause problems such as decrease in the productivity, deterioration in the physical properties of the water-absorbent resin due to uneven drying, and the production trouble or stop after the drying step which is caused by mixing of the non-dried product, but the present invention can solve such problems. Accordingly, in the case of transporting the granulated gel, preferably, the temperature of the produced granulated gel is maintained, and more preferably, the produced granulated gel is heated and/or kept at a temperature equal to the temperature of the hydrogel to be mixed.

Note that in a case where there is no transport step, it is preferred to drop the granulated gel by gravity from the mixing apparatus of the fine powder and the aqueous liquid to the position for mixing with the hydrogel. In this case, the distance from the mixing apparatus to the position for mixing with the hydrogel is preferably within 10 m, more preferably within 5 m, and even more preferably within 3 m. Further, a pipe though which the granulated gel passes is preferably heated and/or kept warm for the same reason as that of the transport machine.

When the granulated gel remains in the apparatus or pipe heated and/or kept warm for a long period of time, the surface of the granulated gel may be dried to become hard. For this reason, it is preferred to mix the granulated gel obtained in the granulation step with the hydrogel as rapidly as possible in a state of being heated to a predetermined temperature. Specifically, the time period from the start of mixing of the fine powder and aqueous liquid in the granulation step to the addition of the resulting granulated gel to the hydrogel in the re-adding step vi-2) is preferably within 5 minutes, more preferably within 3 minutes, and even more preferably within 1 minute. Note that even in a case where mixing with the hydrogel cannot be performed within the above-described time, if the granulated gel whose temperature is lowered is heated again to be a state of being heated to a predetermined temperature, the aggregability is lowered, so that the granulated gel can be further softened. Thus, even when the granulated gel whose temperature is lowered is heated again and then mixed with the hydrogel, a favorable mixed state can be obtained as in the case of mixing within the predetermined period of time.

In order to solve the problem that the surface of the granulated gel is dried, in the time period from the granulation step vi-1) to the re-adding step vi-2), that is, in the transport step until the granulated gel after granulation is added to the hydrogel, the dew point of the atmosphere of the granulated gel is preferably 50° C. or more, more preferably 55° C. or more, even more preferably 60° C. or more, preferably 99° C. or less, more preferably 95° C. or less, and even more preferably 90° C. or less. Further, in the present invention, a preferred embodiment is one in which the dew point of the atmosphere in the granulation step and/or re-adding step in addition to the transport step is controlled to the above-described range. Specifically, the atmosphere inside the apparatus when mixing the fine powder and aqueous liquid in the granulation step and the atmosphere inside the apparatus when adding the granulated gel to the hydrogel are controlled to the above-described range. The "atmospheric dew point" refers to the dew point of the air present in the atmosphere. The atmospheric dew point can be controlled to the above-described range by, for example, blowing water vapor or controlling the circulation rate of hot air.

[2-9-2] Granulated Gel Adding Step

This step is vi-2) a step of adding the granulated gel to the hydrogel crosslinked polymer in at least one step of and/or between steps of the polymerization step i) to the drying step iii) until completion of drying in the drying step iii). Specifically, it is preferred to add the granulated gel in at least one or more steps selected from the group consisting of during the polymerization step, after the polymerization step and before the gel crushing step, during the gel crushing step, after the gel crushing step and before the drying step, and during the drying step. Note that the hydrogel can be obtained even during the polymerization step, and thus the granulated gel may be added during the polymerization step. In addition, a polymer having a solid content of less than 80% by mass in the drying step is normally considered to be a hydrogel. That is, since the hydrogel is present until the middle of the drying step, the granulated gel may be added during the drying step. The granulated gel is preferably added to the hydrogel after the gel crushing step and before the drying step, or during the drying step, and more preferably added to the hydrogel after the gel crushing step ii) and before the drying step iii). When the granulated gel is added to the hydrogel after crushing in this manner, the difference in particle size between both gels is small and therefore mixing is easy, thus preventing uneven drying. In particular, when crushing is performed by controlling the gel crushing energy, the hydrogel has a granulated shape, thus enabling suppression of even more uneven drying. On the other hand, when the granulated gel is added before or during the gel crushing step, the load of the gel crusher is increased and gel crushing becomes unstable, thus failing to control of the gel particle diameter in some cases. Note that the term "before a step" or "after a step" includes all steps before the step or all steps after the step, and means that the granulated gel is added in an optional step such as the transport step or the storing step between steps. For example, the meaning of after the gel crushing step includes the period of transportation from the gel crushing step to the next step and the next step.

In the granulated gel adding step, the solid content of the granulated gel is 50% by mass or more and 90% by mass or less. The details of the solid content of the granulated gel will be described later. In the first embodiment of the present invention, the temperature of the granulated gel is controlled together with the solid content of the granulated gel in the granulated gel adding step. Further, in the second embodiment of the present invention, the solid content of the granulated gel is controlled in the granulated gel adding step, and the gel crushing energy is controlled to a predetermined level in the gel crushing step. In any of the embodiments, the particle diameter of the hydrogel may be preferably further controlled.

(Temperature)

In the present invention, the granulated gel is added to the hydrogel, and the temperature of the granulated gel and the temperature of the hydrogel at that time are each in a range of 50° C. or more and 100° C. or less, preferably 55° C. or more, more preferably 60° C. or more, preferably 95° C. or less, and more preferably 90° C. or less. When the temperature is within such a temperature range, a favorable mixed state of both gels can be obtained. When the temperature of the granulated gel or hydrogel is less than 50° C., the granulated gel becomes hard, or when the hydrogel and granulated gel are mixed, aggregates are formed in some cases as described above. That is, when aggregates are formed during mixing, the hydrogel or granulated gel are further adhered to form a large aggregate, resulting in a poor mixed state. Further, even when mixing can be made, aggregates present in drying tend to cause drying failure, that is, generation of a non-dried product. Also, when the aggregates are dried by continuously heating to have a desired moisture content, other granulated gel and hydrogel which have been already dried become an excessively dried state, leading to deterioration of quality of the water-absorbent resin, such as increase in the soluble component due to heat deterioration. Such a problem occurs even in a case where the temperature of one of the gels is 50° C. or more, and the temperature of the other gel is less than 50° C. On the other hand, when the temperature of the granulated gel or hydrogel is more than 100° C., the gel surface is dried, and, conversely, the gel becomes hard in some cases.

Further, in the present invention, a smaller difference between the temperature of the granulated gel and the temperature of the hydrogel is preferred in the above-described temperature range from the viewpoint of reducing uneven drying. The temperature difference between the both gels is preferably within 40° C., more preferably within 30° C., and even more preferably within 20° C. The adjustment of the temperature of the granulated gel and the temperature of the hydrogel can be appropriately performed by heating and temperature retention in the production process, or heating by hot air or the like from the outside, or cooling by natural cooling, a low temperature air, or the like.

In the second embodiment of the present invention, in order to allow the particulate hydrogel and the granulated gel to have a similar shape, the mass average particle diameter of the particulate hydrogel relative to the mass average particle diameter of the primary particle of the granulated gel is preferably 1 time or more, preferably 10 times or less, and more preferably 5 times or less. Preferably, the mass average particle diameter is the value of the mass average particle diameter of the hydrogel crosslinked polymer after gel crushing step in the granulated gel adding step.

[2-9-3] Gel Mixing Step (Mechanical Mixing)

In the present invention, by controlling the temperatures of the granulated gel and hydrogel to the above-described range, the hydrogel and granulated gel are disintegrated and slightly mixed by slight impact, their own weight, or the like when adding the granulated gel to the hydrogel. In the present invention, a preferred embodiment is one in which the hydrogel and the added granulated gel are further mechanically mixed in at least one step of and/or between steps from the granulated gel adding step to completion of drying in the drying step. In the present invention, as described above, the granulated gel is added to the hydrogel before completion of the drying step. Even in any case where the granulated gel is added in any position, the granulated gel and hydrogel are dried in a mixed state. Note that if the granulated gel and hydrogel are in a state of being uniformly present, generation of the non-dried product can be even more suppressed. Also, being uniformly present may be a mixed state in which the granulated gel and hydrogel are stirred, or a state in which both gels are uniformly dispersed such that the proportion per unit area is substantially the same. Note that in order to exert the effect of the present invention, the time period from addition of the granulated gel to the hydrogel to the start of the mechanical mixing is preferably within 5 minutes, more preferably within 2 minutes, and even more preferably within 1 minute. The time period from the granulation step to the start of the mechanical mixing is preferably within 10 minutes, more preferably within 5 minutes, and even more preferably within 2 minutes. Even at the start time of the mechanical mixing, the temperature of the hydrogel to which the granulated gel is added is in a range of 50° C. or more and 100° C. or less, preferably 55° C. or more, more preferably 60° C. or more, preferably 95° C. or less, and more preferably 90° C. or less.

In the present invention, in order to form the granulated gel and hydrogel in a state of being uniform as much as possible, the granulated gel and/or hydrogel are mechanically mixed. For mechanical mixing, any apparatus that can achieve the above-described coexistence states can be used. Examples include rotation stirring by rotation of a stirring blade, a container itself or the like, or stirring by a feeder that moves like a pendulum, or the like. A rotating stirring apparatus, a swing belt type feeder, and a pendulum type conveyor are exemplified respectively.

In a case where mechanical mixing is performed during the polymerization step, the rotating stirring apparatus is preferably a kneader polymerization apparatus. In a case where mechanical mixing is performed during the gel crushing step, the rotating stirring apparatus is preferably, for example, a kneader or a meat chopper.

Preferably, the mechanical mixing is performed by using a swing belt type feeder or by rotating stirring after the gel crushing step ii) and before the drying step iii) or during the drying step iii), or until completion of drying in the drying step iii). Desirably, in the mechanical mixing, the granulated gel and hydrogel crosslinked polymer are supplied to a swing belt type feeder or rotation stirring. Specifically, drying can be made in an even more homogeneous state by performing the mechanical mixing using a swing belt type feeder or a rotating stirring apparatus after the gel crushing step ii) until the drying step iii), or using a rotating stirring apparatus in the drying step iii). Thus, uneven drying and generation of the non-dried product can be suppressed.

In the case of using a swing belt type feeder, a) when the granulated gel is added to the hydrogel being transported on the transport belt by the swing feeder, uniform dispersion of the granulated gel can be made. Further, b) the hydrogel may be added to the granulated gel being transported on the transport belt by the swing feeder, and c) the granulated gel and hydrogel are supplied to the swing feeder, and both may be supplied onto the transport belt by the swing feeder. In the swing belt type feeder, the belt end reciprocates on the transport belt, and thus even when there is uneven distribution of the granulated gel and hydrogel on the swing belt type feeder, both gels are eventually distributed substantially uniform on the transport belt.

The swing angle θ, belt speed, and the like of the swing feeder can be optionally selected in consideration of the speed of the transport belt, supply amount, or the like. The traveling of the transport belt for one reciprocating motion is preferably within 1 m, and more preferably within 0.5 m. When the traveling distance of the transport belt for one reciprocating motion is too large, uneven distribution of the granulated gel is remarkable. Note that preferably, the transport belt is a ventilation band dryer.

Examples of the rotating stirring apparatus include a type in which the rotating shaft is horizontal and the container itself rotates, a type in which the rotating shaft is horizontal and the container itself is fixed, and a type in which the rotating shaft is the vertical direction and the container itself is fixed. These rotating stirring apparatuses may be either a continuous type or a batch type. Mixing may be performed while leveling the hydrogel staked in the dryer by using the rotary type leveling machine used in the drying step. Further, it is also preferred to perform mixing while drying by using the stirring dryer used in the drying step. The rotation speed or the like of the apparatus is not particularly limited, but is preferably 50 rpm or more, more preferably 100 rpm or more, preferably 500 rpm or less, and more preferably 300 rpm or less. Further, the mixing (residence) time in the mixing apparatus is preferably within 180 seconds, more preferably within 60 seconds, even more preferably within 30 seconds, preferably 0.1 seconds or more, and more preferably 1 second or more.

(Solid Content)

In the present invention, in the above-described condition in the re-adding step, it is preferred that the solid content of the granulated gel and the solid content of the hydrogel are further controlled appropriately. That is, when the solid content of the granulated gel or hydrogel is too small, drying is partially incomplete, or aggregates tend to be generated. Further, when the solid content is too large, the amount of residual monomers tends to be large. In the present invention, preferably, it is desirable that the solid content of the granulated gel and/or the solid content of the hydrogel are within an appropriate range. The solid content of the hydrogel is preferably 30% by mass or more, more preferably 45% by mass or more, preferably 70% by mass or less, more preferably 55% by mass or less, and even more preferably 50% by mass or less. The solid content of the granulated gel is preferably 50% by mass or more, more preferably 55% by mass or more, even more preferably 60% by mass or more, preferably 90% by mass or less, more preferably 85% by mass or less, and even more preferably 80% by mass or less. Preferably, the solid content of the granulated gel in the re-adding step is in the above-described range. More preferably, the solid content of the granulated gel is in the above-described range, and the temperature of the granulated gel and the temperature of the hydrogel are within the above-described range. Further, it is also preferred that the granulated gel solid content of the granulated gel in the re-adding step is within the above-described range and the GGE in the gel crushing step is within the above-described range.

Further, in the present invention, in consideration of achieving more even drying, the solid content of the granulated gel is preferably higher than the solid content of the hydrogel, preferably in a case where the solid content of one of gels is satisfied, more preferably in a case where the solid contents of both gels are satisfied. The reason why the solid content of the granulated gel is high is that the high solid content of the granulated gel results in reduced drying load and the amount of residual monomers in the granulated gel is normally smaller than the solid content of the hydrogel. Specifically, the difference (A−B) between the solid content A (%) of the granulated gel and the solid content B (%) of the hydrogel is preferably 6 or more, more preferably 11 or more, even more preferably 16 or more, preferably 60 or less, more preferably 50 or less, and even more preferably 40 or less. When the difference in the solid content between both gels is set to the above-described range, the drying load is small and uneven drying is even more suppressed, thus avoiding the troubles in the production and the problem in quality. Conventionally, a large difference in the solid content results in uneven drying. However, the condition of the present invention enables reduction in the drying load without raising a problem.

In the present invention, the ratio of the granulated gel and hydrogel may be appropriately determined by the amount of the separated fine powder and the setting of the solid content of the granulated gel. From the viewpoint of the physical properties of the water-absorbing agent, the granulated gel is normally added so as to be an amount of preferably 10 parts by mass or more, preferably 15 parts by mass or more, more preferably 20 parts by mass or more, preferably 50 parts by mass or less, more preferably 40 parts by mass or less, and even more preferably 30 parts by mass or less relative to 100 parts by mass (as-is basis) of the hydrogel. According to the method of recycling fine powder of the present invention, even when the amount is 10 parts by mass or more of the amount of the granulated gel, uneven drying can be suppressed. Note that when the proportion of the granulated gel is too large, the final quality and physical properties of the water-absorbent resin as a final product is significantly affected by the recycled fine powder, that is, the granulated gel.

The hydrogel crosslinked polymer to which the granulated gel is added is treated in the drying step. Since the drying condition and the like of a mixed gel is the same as those of the drying step iii), the description thereof will be omitted here. Further, the crushing step iv) and the classifying step v) performed after the drying step are as described above, and the surface crosslinking step, the sizing step, and the like are performed as necessary, thus obtaining a water-absorbent resin to be a product. Further, the fine powder obtained in the classifying step v) or the like is also treated in the recycling step vi).

[2-10] Other Steps

In the present invention, it is possible to further include, as necessary, at least one step selected from a transport step, a storing step, a packaging step, a reserving step, or the like, in addition to the steps described above.

This application claims the benefit of the priority based on Japanese Patent Application No. 2018-094788 filed on May 16, 2018, and Japanese Patent Application No. 2018-210731 filed on Nov. 8, 2018. The entire contents of Japanese Patent Application No. 2018-094788 filed on May 16, 2018, and Japanese Patent Application No. 2018-210731 filed on Nov. 8, 2018 are herein incorporated by reference.

EXAMPLES

Hereinafter, the present invention will be described with reference to the examples. The present invention should not be construed to be limited to by the examples. Further, the various physical properties described in the claims or examples of the present invention were determined under the conditions of room temperature (20° C. or more and 25° C. or less) and a humidity of 50RH % in accordance with the EDANA method and the following measurement methods unless otherwise specified. For the electrical devices used in the examples below, a power source of 200 V or 100 V and 60 Hz was used. Further, "liter" may be abbreviated as "L", and "% by mass" or "% by weight" may be abbreviated as "wt %" for the sake of convenience in some cases.

(a) Gel Crushing Energy

In the examples, the gel crushing energy was calculated based on Equation (1) below. Note that each input value will be described in each example.

$$\text{Gel crushing energy (J/g)} = \{\sqrt{3} \times \text{voltage} \times \text{current} \times \text{power factor} \times \text{motor efficiency}\} / \{\text{mass of hydrogel introduced into gel crusher for one second}\} \quad \text{Equation (1)}$$

In Equation (1), the "power factor" and the "motor efficiency" are values inherent to the gel crushing apparatus, vary depending on the operation condition and the like of the gel crushing apparatus, and show a value of 0 or more and 1 or less. Further, the unit of voltage is "V", the unit of current is "A", and the unit of mass of a hydrogel crosslinked polymer is "g/s". Note that in a case where the gel crushing apparatus is driven by single-phase alternating current power, the gel crushing energy is calculated by changing "$\sqrt{3}$" in Equation (1) to "1".

(b) Moisture Content

In the examples, the "moisture content" was measured in accordance with the method described in ERT430.2-02.

The moisture content of the powder-like water-absorbent resin was measured by changing the sample amount to 1 g, the drying temperature to 180° C. The moisture contents of the granulated gel and particulate hydrogel were each measured by changing the sample amount to 2 g, the drying temperature to 180° C. For the block-like dried polymer, five samples were obtained at various positions and the samples were crushed such that the particle diameter is 5 mm or less. The moisture contents were measured for the samples as in the powder-like water-absorbent resin, and the average value thereof was used.

(c) Mass Average Particle Diameter (D50) of Hydrogel

In the examples, the "mass average particle diameter (D50)" of the hydrogel was measured by the following method.

First, 20 g of a hydrogel having a solid content of α % by mass at 20° C. or more and 25° C. or less was added to 500 g of a surfactant aqueous solution to form a dispersion. Note that the surfactant aqueous solution is a solution prepared by adding 0.08% by mass of a surfactant (manufactured by Kao Corporation: Emal 20 C) to a 20% by mass sodium chloride aqueous solution. Further, a polypropylene container having a capacity of about 1.14 L was used.

Subsequently, a stirrer chip (length: 50 mm×diameter 7 mm) is placed in the dispersion and the content was stirred at 300 rpm for 60 minutes.

After end of stirring, the dispersion was placed on a central portion of JIS standard sieves provided on a rotary table (diameter: 21 cm, mesh opening size: 8 mm/4 mm/2 mm/1 mm/0.6 mm/0.3 mm/0.15 mm/0.075 mm). Also, the entire hydrogel remaining in the polypropylene container was washed out onto the sieve by using 100 g the surfactant aqueous solution. Then, the hydrogel was classified by uniformly spraying 6,000 g of the surfactant aqueous solution onto the sieve by using a shower (number of holes: 72, flow rate: 6.0 L/min) from 30 cm above the sieve in a manner such that the spraying range (50 cm²) entirely covered the sieve while rotating the sieve by hand (at 20 rpm).

Thereafter, the hydrogel remaining on each of the sieves was drained for 2 minutes, and then the weight was measured. The mass percentage "mass %" of the hydrogel remaining on the sieve obtained in this operation was determined based on Equation (2) below. The mesh opening size of the JIS standard sieve used in the operation was converted into the mesh opening size used in the classification of the hydrogel having a solid content of a % by mass in accordance with Equation (3) below. The particle size distribution of the hydrogel obtained from Equations (2) and (3) was plotted on logarithmic probability paper. The particle diameter at which the cumulative percentage "% R" of particles on sieve corresponds to 50% by mass was used as the mass average particle diameter (D50) of the hydrogel.

$$X (\%) = (w/W) \times 100 \quad \text{Equation (2)}$$

$$R(\alpha)(\text{mm}) = (20/W)^{1/3} \times r \quad \text{Equation (3)}$$

wherein

X: mass percentage "mass %" (%) of the hydrogel remaining on each sieve after draining w: mass (g) of the hydrogel remaining on each sieve after draining W: total sum of mass (g) of the hydrogel remaining on each sieve after draining R(α): mesh opening size (mm) of the sieve converted in classification of the hydrogel with a solid content of α % by mass r: mesh opening size (mm) of the sieve used for classification of the hydrogel swollen with a surfactant solution.

(d) Mass Average Particle Diameter (D50) of Primary Particle of Granulated Gel

In the present invention, the "mass average particle diameter (D50)" of the hydrogel was determined by using the granulated gel in place of the hydrogel in the measurement method of (c) Mass Average Particle Diameter (D50) of Hydrogel. Note that since granulation of the granulated gel is broken to be disintegrated during the measurement, it is referred to as the mass average particle diameter of the "primary particle".

(e) Flowability Evaluation of Granulated Gel

A granulated gel (100 g) obtained by adding an aqueous liquid to fine powder to perform granulation in each of the examples was introduced into a cylindrical plastic container (inner wall: fluororesin coating, height: 12 cm, bottom diameter: 8 cm) immediately after granulation. After a lapse of a predetermined time, the charging port of the container was closed with a vat, and the container was turned upside down and allowed to stand. Then, the cylindrical plastic container was pulled upward and allowed to stand for 3 minutes. Thereafter, the largest width of the granulated gel spread on the vat by its weight was measured and determined as the degree of aggregate disintegration (unit: cm). The flowability of the granulated gel was evaluated based on the degree of aggregate disintegration.

(Evaluation Criteria)

Degree of aggregate disintegration: poor: 10 cm or less: it is difficult to disintegrate Degree of aggregate disintegration: good: 11 cm or more and 15 cm or less: it is easy to disintegrate Degree of aggregate disintegration: excellent: 16 cm or more: it is considerately easy to disintegrate Production Example 1

(Polymerization Step)

Acrylic acid, 48.5% by mass of a sodium hydroxide aqueous solution, polyethylene glycol diacrylate (PEGDA, average molecular weight: 523), and deionized water were mixed, and the temperature of the resulting mixed solution was kept at 90° C. Then, 3% by mass of a sodium persulfate (NaPS) aqueous solution was added to the mixed solution while the mixed solution was stirred, thus preparing an aqueous monomer solution. In the aqueous monomer solution, the monomer concentration was 43% by mass, the neutralization ratio was 71 mol %, the PEGDA concentration was 0.07 mol % (with respect to the monomer), and the NaPS concentration was 0.05 mol % (with respect to the monomer).

Polymerization reaction was started immediately after addition of the sodium persulfate aqueous solution, and 3 minutes later, a sheet-like hydrogel crosslinked polymer (hereinafter, referred to as "hydrogel") was obtained.

(Gel Crushing Step)

The sheet-like hydrogel obtained in the polymerization step was gel crushed by using a meat chopper. Note that when the sheet-like hydrogel was introduced into the meat chopper, hot water having a temperature of 80° C. was added. Further, a perforated plate with a pore size of 7.5 mm was provided in a tip of the discharging port of the meat chopper. The gel crushing energy in the gel crushing in Production Example 1 was 5 J/g, the mass average particle diameter (D50) of the hydrogel after gel crushing (1) (hereinafter, referred to as "particulate hydrogel") was 1.7 mm, and the moisture content was 53% by mass.

(Drying Step)

The particulate hydrogel (1) obtained in the gel crushing step was stacked on a 20-mesh wire gauze such that the average thickness is 5 cm, and then dried by using a ventilation dryer (manufactured by Satake Chemical Equipment Mfg., Ltd.: product No. 71-S6). Drying was performed under the drying conditions of using hot air at 190° C. and ventilation for 20 minutes to prepare a dried polymer. The drying was ended without any problem, and no non-dried product was found in the dried polymer. The moisture content of the dried polymer was 5% by mass. Note that the ventilation dryer used in the examples has substantially the same drying behavior as that of the ventilation band dryer except for the difference between the batch type and the continuous type, and thus this result can also be applied to the ventilation band dryer.

(Crushing Step and Classifying Step)

The dried polymer obtained in the drying step was crushed by a roll mill, and then classified by using two types of sieves having a mesh opening size of 850 μm and 150 μm. For the dried polymer remained on the sieve having a mesh opening size of 850 μm, crushing and classification were repeated until the total amount of the dried polymer has passed through the sieve having a mesh opening size of 850 μm. Through this operation, a water-absorbent resin particle before surface crosslinking remained on the sieve having a mesh opening size of 150 μm and a fine powder (A) which has passed through the sieve having a mesh opening size of 150 μm were obtained.

(Surface Crosslinking Step and Adding Step of Surface Modifier)

A surface crosslinking agent aqueous solution containing 0.3 parts by mass of ethylene carbonate, 0.5 parts by mass of propylene glycol, and 2.7 parts by mass of deionized water was prepared. Then, 3.5 parts by mass of the surface crosslinking agent aqueous solution was sprayed and mixed to 100 parts by mass of the water-absorbent resin before surface crosslinking while stirring the water-absorbent resin. Thereafter, the resulting mixture was heat treated at 200° C. for 40 minutes to perform surface crosslinking.

Subsequently, an additive aqueous solution containing 1 part by mass of a 27% by mass aluminum sulfate aqueous solution and 0.2 parts by mass of a 60% by mass sodium lactate aqueous solution was added to the resulting mixture while stirring and cooling the mixture to prepare a water-absorbent resin after surface crosslinking (1).

(Sizing Step)

The water-absorbent resin after surface crosslinking (1) obtained by the above-described operation was classified by using two types of sieves having a mesh opening size of 850 μm and 150 μm. For the aggregated water-absorbent resin remained on the sieve having a mesh opening size of 850 μm, the aggregates thereof were disintegrated and classification was repeated until the total amount of the aggregated water-absorbent resin has passed through the sieve having a mesh opening size of 850 μm. Through this operation, a water-absorbent resin (1) remained on the sieve having a mesh opening size of 150 μm and a fine powder (B) which has passed through the sieve having a mesh opening size of 150 μm were obtained.

In the water-absorbent resin (1), the water absorption capacity without pressure (CRC) was 27 g/g, the water absorption capacity under a pressure of 0.7 psi (AAP) was 24 g/g, and the saline solution liquid permeability (SFC) was $120 \times 10^{-7} \times cm^3 \times s \times g^{-1}$.

Example 1

(Granulation Step)

The fine powder (A) and fine powder (B) obtained in Production Example 1 were mixed at a ratio of 17:3 to prepare a fine powder (1). The mass average particle diameter of the fine powder (1) was 91 μm.

After 60 g of the fine powder (1) was heated to 77° C., 40 g of deionized water at 78° C. as an aqueous liquid was added to the fine powder (1) over 5 seconds while stirring the fine powder (1) by a food cutter heated to 80° C. by an oven. Then, the mixture was further stirred for 5 seconds to perform granulation. The granulated product obtained by this operation was used as a granulated gel (1). The moisture content of the granulated gel (1) was 40% by mass. Further, the number average particle diameter of the granulated gel (1) was 2.5 mm, and the mass average particle diameter of the primary particle was 138 μm.

(Granulated Gel Adding Step)

Subsequently, 80 g of the granulated gel (1) was placed in a cylindrical plastic container (diameter: 8 cm) used for (e)

Flowability Evaluation of Granulated Gel, assuming transportation by a pipe or a bucket conveyor, and then transported. The granulated gel was added to 360 g of the particulate hydrogel obtained in Production Example 1 after a lapse of 2.5 minutes from the time point of starting mixing of the fine powder (1) and the deionized water, that is, the start of granulation ("time lapse from granulation start" in table). Immediately after this addition, the contents of the container were mixed by a mortar mixer heated to 80° C. (manufactured by Nishinihon Shikenki) for 10 seconds. The resulting mixture (1) was used as a mixed gel (1).

Incidentally, the temperatures of the granulated gel (1) and particulate hydrogel (1) immediately before mixing by the mortar mixer were respectively 64° C. and 55° C. The mixability of the granulated gel (1) and particulate hydrogel (1) by the mortar mixer was good.

(Drying Step)

Thereafter, the mixed gel (1) was stacked on a 20-mesh wire gauze and dried by using the ventilation dryer as in the Production Example 1. In the drying condition, the hot air temperature was 190° C., and the drying time was 20 minutes. The average thickness on the wire gauze was 5 cm. The drying was ended without any problem, and no non-dried product was contained in the dried polymer (1). The moisture content of the dried polymer (1) was 5% by mass. Note that this drying step was performed by using the drying step in Production Example 1 as a model and employed the same condition as that of Production Example 1.

The same operation as in steps after the crushing step of Production Example 1 was performed on the dried polymer (1) obtained in the drying step to produce a water-absorbent resin.

As a result of evaluating the flowability of the granulated gel (1), the degree of aggregate disintegration was 12 cm. As a result of evaluating the flowability when the standing time was changed from 3 minutes to 1 minute, and from 3 minutes to 4 minutes, the degree of aggregate disintegration was 15 cm for 1 minute, and 11 cm for 4 minutes.

Comparative Example 1

A granulated gel (1a), a mixed gel (1a), and a dried polymer (1a) were respectively produced by performing the granulation step, the granulated gel adding step, and the drying step as in Example 1 expect for changing to the condition described in Table 1. In this example, since the time lapse from the start of granulation of the granulated gel (1a) to mixing with the particulate hydrogel (1) was particularly long, the temperature of the granulated gel (1a) was lowered due to natural cooling. The granulated gel (1a) and particulate hydrogel (1) were mixed by the mortar mixer. The granulated gel (1a) and particulate hydrogel (1) were partially adhered to form aggregates. When the aggregates were checked, the granulated gel (1a) was a hard mass, and the particulate hydrogel (1) was adhered and aggregated around the granulated gel (1a). In addition, when the mixed gel (1a) was stacked on the wire gauze in the drying step, the average thickness of the gel layer on the wire gauze was 4 cm. The thickness of a part of the gel layer including aggregates was 6 cm, and the aggregates could not be disintegrated in this state. The mixed gel (1a) was dried in this state, and a dried product and a non-dried product were present in the resulting dried polymer (1a). As a result of evaluating the flowability of the granulated gel (1a), the degree of aggregate disintegration was 10 cm. The moisture content of the dried polymer (1a) was approximately 5% by mass, but a plurality of non-dried products having a moisture content of 20% by mass or more were present.

Example 2

A granulated gel (2) was produced by performing the same operation as in Example 1 except for changing the condition to the condition described in Table 1. In this example, since the time lapse from the start of granulation of the granulated gel (2) to mixing with the particulate hydrogel (1) was particularly long, the temperature of the granulated gel (2) was lowered due to natural cooling. However, the granulated gel (2) was heated again so that the moisture does not evaporate from the granulated gel (2) before mixing with the particulate hydrogel (1). In the mixing by the mortar mixer, the granulated gel (2) exhibited a good mixability with the particulate hydrogel (1). Further, in the drying step, the average thickness of the gel layer on the wire gauze was 5 cm. Drying was ended without any problem, and no non-dried product was contained in the dried polymer (2). The moisture content of the dried polymer was approximately 5% by mass. As a result of evaluating the flowability of the granulated gel (2), the degree of aggregate disintegration was 12 cm.

Comparative Example 2

A granulated gel (2a) was produced by performing the same operation as in Example 1 except for changing to the condition described in Table 1. In this example, particularly, the temperature of the particulate hydrogel (1) during mixing was set to be low. The granulated gel (2a) and particulate hydrogel were mixed by a mortar mixer, but aggregated in the middle of the mixing to form a large mass of gel. The mortar mixer was stopped due to an excessive load, and thus mixing was stopped. The mass of aggregated gel was split into pieces having a diameter of about 5 cm by hand, and the split gels were placed on a wire gauze such that the average thickness of the gel layer was 5 cm and then dried. A plurality of non-dried products having a moisture content of 20% by mass or more were present in the dried polymer (2a).

Example 3

Using a surfactant aqueous solution as the aqueous liquid, the same operation as in Example 1 was performed by changing the condition to the condition described in Table 1. Specifically, a granulated gel (3) was produced in the same manner as in Example 1 except for first adding 28 g of deionized water at 82° C. to the fine powder (1) obtained in the same manner as in Example 1 over 3 seconds, and then adding 12 g, that is, 200 ppm of a 0.1% by mass polyoxyethylene sorbitan monostearate (TWEEN 60) aqueous solution at 25° C. to the fine powder (1) over 2 seconds. The particle diameter and primary particle diameter of the resulting granulated gel (3) was similar to the particle diameter of the granulated gel (1), and the moisture content of the granulated gel (3) was 40% by mass. Subsequently, the granulated gel adding step was performed in the same manner as in Example 1 under the condition described in Table 1 to obtain a mixed gel (3). At this time, the granulated gel (3) exhibited better flowability than the granulated gel (1). Further, the mixability of the granulated gel (3) and particulate hydrogel (1) was good when mixing by the mortar mixer. Thereafter, the mixed gel (3) was subjected to the drying step in the same manner as in Example 1. The average thickness of the gel layer on the wire gauze was 5 cm. Drying was ended without any problem, and no non-dried product was contained in the dried polymer (3). The moisture content of the dried polymer (3) was approximately 5% by mass. As a result of evaluating the flowability of the granulated gel (3), the degree of aggregate disintegration was 16 cm.

Example 4

Using a surfactant aqueous solution as the aqueous liquid, the same operation as in Example 1 was performed by changing the condition to the condition described in Table 1. Specifically, a granulated gel (4) was produced in the same manner as in Example 1 except for first adding 28 g of deionized water at 79° C. to the fine powder (1) obtained in the same manner as in Example 1 over 4 seconds, and then adding 6 g, that is, 1,000 ppm of a 1% by mass lauryl dimethyl amino acetic acid betaine aqueous solution at 25° C. to the fine powder (1) over 2 seconds. The number average particle diameter of the resulting granulated gel (4) was 1 mm, the primary particle diameter of the resulting granulated gel (4) was similar to the particle diameter of the granulated gel (1), and the moisture content of the granulated gel (4) was 40% by mass. Subsequently, the granulated gel adding step was performed in the same manner as in Example 1 under the condition described in Table 1 to obtain a mixed gel (4). At this time, the granulated gel (4) exhibited better flowability than the granulated gel (1). Further, the mixability of the granulated gel (4) and the particulate hydrogel (1) was good when mixing by the mortar mixer. Further, in the drying step, the average gel thickness on the wire gauze was 5 cm. Drying was ended without any problem, and no non-dried product was contained in the dried polymer (4). The moisture content of the dried polymer (4) was approximately 5% by mass. As a result of evaluating the flowability of the granulated gel (4), the degree of aggregate disintegration was 19 cm.

Example 5-1

The same operation as in Example 1 was performed by changing the particulate hydrogel (1) to a particulate hydrogel (2) which is gel crushed more finely and changing the condition to the condition described in Table 1 in Example 1. The particulate hydrogel (2) is obtained by gel crushing again by a meat chopper having a die diameter of 7.5 mm without adding hot water to the particulate hydrogel in Production Example 1. The gel crushing energy at that time (total of GGEs of two times of gel crushing) was 35 J/g. The mass average particle diameter (D50) of the particulate hydrogel (2) was 0.4 mm, and the moisture content thereof was 53% by mass. The granulation step and granulated gel adding step were performed in the same manner as in Example 1 under the condition described in Table 1 to obtain a mixed gel (5). The mass average particle diameter of the primary particle of the granulated gel (5) was 138 μm, and the granulated gel (5) had better flowability than the granulated gel (1). Further, the mixability of the granulated gel (5) and the particulate hydrogel (2) was good when mixing by the mortar mixer in the granulated gel adding step. Thereafter, the mixed gel (5) was subjected to the drying step in the same manner as in Example 1. The average gel thickness on the wire gauze was 6 cm. Drying was ended without any problem, and no non-dried product was contained in the dried polymer (5-1). The moisture content of the dried polymer (5-1) was approximately 4% by mass. As a result of evaluating the flowability of the granulated gel (5), the degree of aggregate disintegration was 12 cm.

Example 5-2

A dried polymer (5-2) was obtained in the same manner as in Example 5-1 except for reducing the drying time to 15 minutes. No non-dried product was contained in the dried polymer (5-2). The moisture content of the dried polymer (5-2) was approximately 5% by mass.

Example 6

A dried polymer (6) was produced in the same manner as in Example 5-1 by changing the condition to the condition described in Table 1. Thereafter, a mixed gel (6) was subjected to the drying step in the same manner as in Example 5-1. The average gel thickness on the wire gauze was 6 cm. Drying was ended without any problem, and no non-dried product was contained in the dried polymer (6). The moisture content of the dried polymer (6) was approximately 4% by mass. As a result of evaluating the flowability of a granulated gel (6), the degree of aggregate disintegration was 10 cm.

Production Example 2

(Polymerization Step and Gel Crushing Step)
In a dual-arm type kneader made of stainless having a capacity of 10 liter and equipped with two sigma-type blades and a jacket, to 5,500 g of a sodium acrylate aqueous solution having a monomer concentration of 38% by mass and a neutralization ratio of 75%, and 12.4 g of polyethylene glycol diacrylate (average molecular weight: 523) were introduced. The mixture was sufficiently degassed with nitrogen blow while the temperature of contents were regulated to 30° C. Then, 28 g of a 10% by mass sodium persulfate aqueous solution and then 24 g of 0.1% by mass L-ascorbic acid were added to the mixture while rotating the blades to start polymerization. When the temperature of the jacket was regulated, the polymerization peak temperature exhibited 90° C. 11 minutes after the start of polymerization. After the temperature reached the polymerization peak, gel crushing was performed by further rotating the blades for 30 minutes. Thus, a particulate hydrogel (P2) having a mass average particle diameter (D50) of 2.1 mm and a moisture content of 61% by mass was obtained.
(Drying Step)
The particulate hydrogel (P2) obtained in the gel crushing step was stacked on a 20-mesh wire gauze such that the average thickness is 4 cm, and then dried by using a ventilation dryer (manufactured by Satake Chemical Equipment Mfg., Ltd.: product No. 71-S6). Drying was performed under the drying conditions of using hot air at 190° C. and ventilation for 20 minutes to prepare a dried polymer (P2). The drying was ended without any problem, and no non-dried product was found in the dried polymer (P2). The moisture content of the dried polymer (P2) was 5% by mass.

The dried polymer (P2) was subjected to the crushing step, the classifying step, the surface crosslinking step, the adding step of the surface modifier, and the sizing step in the same manner as in Production Example 1. As a result, a water-absorbent resin (P2) having a CRC, AAP, and SFC which are similar to those of Production Example 1 was obtained. Further, in the classifying step, a fine powder (A2) which has passed through the sieve having a mesh opening size of 150 μm was obtained. In the sizing step, a fine powder (B2) which has passed through the sieve having a mesh opening size of 150 μm was obtained.

Example 7

(Granulation Step)

The fine powder (A2) and fine powder (B2) obtained in Production Example 2 were mixed at a ratio of 16:4 to prepare a fine powder (7). The mass average particle diameter of the fine powder (7) was 87 μm.

After 180 g of the fine powder (7) was heated to 79° C., 120 g of deionized water at 81° C. as an aqueous liquid was added to the fine powder (7) over 10 seconds while stirring the fine powder (7) by a food cutter heated to 80° C. by an oven. Then, the mixture was further stirred for 5 seconds to perform granulation. The granulated product obtained by this operation was used as a granulated gel (7). The moisture content of the granulated gel (7) was 40% by mass. Further, the number average particle diameter of the granulated gel (7) was 1.8 mm, and the mass average particle diameter of the primary particle was 130 μm.

(Granulated Gel Adding Step)

Subsequently, 280 g of the granulated gel (7) was placed in a cylindrical plastic container (diameter: 12 cm), assuming transportation by a pipe or a bucket conveyor, and then transported. The granulated gel was added to the particulate hydrogel (P2) obtained in Production Example 2 after a lapse of 2.5 minutes from the time point of starting mixing of the fine powder (7) and the deionized water, that is, the start of granulation ("time lapse from granulation start" in table). Immediately after this addition, the contents of the container were mixed by the kneader for 5 minutes. The resulting mixture (7) was used as a mixed gel (7).

Incidentally, the temperatures of the granulated gel (7) and particulate hydrogel (P2) immediately before mixing by the kneader were respectively 62° C. and 63° C. The mixability of the granulated gel (7) and particulate hydrogel (2A) by the mortar mixer was good. As a result of evaluating the flowability of the granulated gel (7), the degree of aggregate disintegration was 12 cm.

(Drying Step)

Thereafter, the mixed gel (7) was stacked on a 20-mesh wire gauze and dried by using the ventilation dryer as in the Production Example 1. In the drying condition, the hot air temperature was 190° C., and the drying time was 20 minutes. The average thickness on the wire gauze was 5 cm. The drying was ended without any problem, and no non-dried product was contained in the dried polymer (7). The moisture content of the dried polymer (7) was 5% by mass.

The same operation as in steps after the crushing step of Production Example 2 was performed on the dried polymer (P2) obtained in the drying step to produce a water-absorbent resin (7).

Comparative Example 3

A granulated gel (7A), a mixed gel (7A), and a dried polymer (7A) were respectively produced by performing the granulation step, the granulated gel adding step, and the drying step as in Example 7 expect for changing to the condition described in Table 1. In this example, since the time lapse from the start of granulation of the granulated gel (7A) to mixing with the particulate hydrogel (P2) was particularly long, the temperature of the granulated gel (7A) was lowered due to natural cooling. The granulated gel (7A) and particulate hydrogel (P2) were mixed by the mortar mixer. The granulated gel (7A) and particulate hydrogel (P2) were partially adhered to form aggregates. When the aggregates were checked, the granulated gel (7A) was a hard mass, and the particulate hydrogel (P2) was adhered and aggregated around the granulated gel (7A). In addition, when a mixed gel (7A) is stacked on the wire gauze in the drying step, the average thickness of the gel layer on the wire gauze was 4 cm. The thickness of a part of the gel layer including aggregates was 7 cm, and the aggregates could not be disintegrated in this state. The mixed gel (7A) was dried in this state, and a dried product and a non-dried product were present in the resulting dried polymer (7A). As a result of evaluating the flowability of the granulated gel (7A), the degree of aggregate disintegration was 10 cm. The moisture content of the dried polymer (7A) was approximately 5% by mass, but a plurality of non-dried products having a moisture content of 20% by mass or more were present.

TABLE 1

|  | Temperature of fine powder [° C.] | Temperature of aqueous liquid [° C.] | Time lapse from granulation start [min] | Temperature of granulated gel (immediately before mixture) [° C.] | Temperature of particulate hydrogel (immediately before mixture) [° C.] | Non-dried product | Degree of aggregate disintegration (cm) |
|---|---|---|---|---|---|---|---|
| Example 1 | 77 | 78 | 2.5 | 64 | 55 | Absent | 12 |
| Comparative Example 1 | 71 | 71 | 200 | 30 | 55 | Present | 10 |
| Example 2 | 72 | 76 | 200 | 70 | 55 | Absent | 12 |
| Comparative Example 2 | 75 | 79 | 3 | 68 | 25 | Present | — |
| Example 3 | 75 | 82/25 *1 | 3 | 67 | 55 | Absent | 16 |
| Example 4 | 78 | 79/25 *1 | 3 | 65 | 55 | Absent | 19 |
| Example 5-1 | 67 | 82 | 2 | 70 | 55 | Absent | 12 |
| Example 5-2 | 67 | 82 | 2 | 70 | 55 | Absent | — |
| Example 6 | 69 | 80 | 200 | 30 | 55 | Absent | 10 |
| Example 7 | 79 | 81 | 2.5 | 62 | 63 | Absent | 12 |
| Comparative Example 3 | 80 | 82 | 200 | 30 | 62 | Present | 10 |

*1 Temperature of hot water/temperature of surfactant aqueous solution

Production Example 3

(Polymerization Step)

An aqueous monomer solution containing 300 parts by mass of acrylic acid, 100 parts by mass of a 48% by mass sodium hydroxide aqueous solution, 0.61 parts by mass of polyethylene glycol diacrylate (average n: 9), 16.4 parts by mass of a 0.1% by mass trisothum diethylene triamine pentaacetate aqueous solution, and 273.2 parts by mass of deionized water was prepared. To the aqueous monomer solution, 150.6 parts by mass of a 48% by mass sodium hydroxide aqueous solution was further continuously mixed in a static mixer. Note that the liquid temperature of the aqueous monomer solution at this time was raised to 87° C. from the heat of neutralization.

Further, 14.6 parts by mass of a 4% by mass sodium persulfate aqueous solution was continuously mixed in a static mixer, and then supplied to a continuous belt polymerization apparatus. Thereafter, polymerization was continuously performed (polymerization time: 3 minutes) to obtain a belt-like hydrogel (P3). The resulting belt-like hydrogel (P3) was continuously cut at equidistance in the width direction with respect to the traveling direction of the polymerization belt so that the gel is cut with a length of 300 mm to obtain a strip-like hydrogel (P3).

(Gel Crushing Step)

Gel crushing was performed while supplying the strip-like hydrogel (P3) obtained in the polymerization step and a 3.1% by mass lauryl dimethyl amino acetic acid betaine aqueous solution to a meat chopper at the same time. The supply amount of the lauryl dimethyl amino acetic acid betaine aqueous solution was 0.15% by mass relative to the solid content of the hydrogel (P3). The resulting hydrogel was gel crushed once again by the meat chopper. The gel crushing energy required for two times of crushing was 51 J/g. The resulting particulate hydrogel (P3) had a solid content ratio of 44% by mass (moisture content was 56% by mass) and a mass average particle diameter (D50) of 170 μm.

(Drying Step)

The particulate hydrogel (P3) was dried by using a stirring dryer. Note that this dryer is a rotary drum type dryer equipped with heating tubes. A cylindrical container that has a charging port for the hydrogel and a discharging port for a dried polymer rotates. The particulate hydrogel can be dried by heating with heating tubes provided inside the container. First, a 2.7 MPa (temperature: 228.1° C.) of water vapor was introduced in each heating tube. The interior of the rotating container (defined by a contact thermometer) was preheated to more than 200° C. Further, the outer wall of the rotating container was sufficiently heated with a steam tracing. Thereafter, the particulate hydrogel (P3) was supplied to the dryer, and continuous drying was performed by rotating the rotating container so that the Froude number (Fr) was 0.07 with an average residence time of 50 minutes. The dried polymer (P3) had a solid content ratio of 98.5% by mass and a proportion of particles remaining on a sieve having a mesh opening size of 2,800 μm of 7.4% by mass in terms of solid content.

The dried polymer (P3) discharged from the discharging port of the dryer was forcibly cooled to 80° C. or less by cold air, and then crushed by the roll mill to obtain a dried polymer crushed product (P3). The dried polymer crushed product (P3) was classified by using two types of sieves having a mesh opening size of 850 μm and 180 μm. Through this operation, a powder-like water-absorbent resin before surface crosslinking which has passed through the sieve having a mesh opening size of 850 μm and remained on the sieve having a mesh opening size of 180 μm, and a fine powder (A3) which has passed through the sieve having a mesh opening size of 180 μm were obtained. The fine powder (A3) had a solid content ratio of 95.2% by mass and a mass average particle diameter (D50) of 102 μm.

Example 8

Granulation of fine powder was performed by using a vertical rotated disk type mixer equipped with a stirring vane, a disintegrating vane, a discharging vane, and a nozzle and having an internal volume of 7 L (effective volume of the stirring part: 5 L). The fine powder (A3) obtained in Production Example 3 was supplied to the vertical rotated disk type mixer by using a quantitative feeder (produced by Accurate Inc.) at a rate of 200 kg/hr. Subsequently, 166 kg/hr of a 0.253% by mass lauryl dimethyl amino acetic acid betaine aqueous solution at 50° C. and 15 kg/hr of water vapor (gauge pressure: 0.6 MPa, and the internal pressure of the mixer was released) were injected while stirring the fine powder (A3) by rotating the stirring vane of the mixer at 1,060 rpm and continuously mixed to perform granulation. A granulated gel (8) obtained by the operation was placed in a cylindrical plastic container (diameter: 8 cm) used for (e) Flowability Evaluation of Granulated Gel, sealed with a cap, and stored while keeping warm. After a lapse of 60 minutes after collection, the resulting product was used for the next experiment. The moisture content of the granulated gel (8) was 50% by mass. The number average particle diameter of the granulated gel (8) was 1.7 mm, and the degree of aggregate disintegration at 60° C. after collection was 20 cm.

The mass ratio of the particulate hydrogel (P3) to the granulated gel (8) was set to 85/15, and both gels were introduced into a dryer while mixing by a screw feeder, and dried in the same manner as in Production Example 3 except for mixing in the dryer. The temperatures of the particulate hydrogel (P3) and granulated gel (8) immediately before charging into the feeder were respectively 95° C. and 60° C. In the resulting dried polymer (8), the proportion of the particles remaining on the sieve having a mesh opening size of 2,800 μm was 12.1% by mass in terms of solid content. There was no problem with the roll mill crushing.

Production Example 4

A surface-crosslinked dried polymer (P4) and a dried polymer crushed product (P4) were obtained by performing drying, cooling, and crushing in the same manner as in Production Example 3 except for spray-adding 2.16% by mass of a surface crosslinking solution (based on solid content of the particulate hydrogel (P3)) containing 0.16% by mass of ethylene glycol diglycidyl ether and 2% by mass of water to the particulate hydrogel (P3) in the middle of drying in the stirring dryer of Production Example 3. A surface-crosslinked powder-like water-absorbent resin (P4) and a fine powder (B4) were obtained by further adding 0.3 parts by mass of hydrotalcite (product name "DHT-6" manufactured by Kyowa Chemical Industry Co., Ltd., $Mg_6Al_2(OH)_{16}CO_3 \cdot 4H_2O$, volume average particle diameter: 0.5 μm) to 100 parts by mass of the dried polymer crushed product (P4) and performing classification in the same manner as in Production Example 3. For the particulate hydrogel (P3) at the time of addition of the surface crosslinking solution, the moisture content was 30% by mass and the temperature was 110° C. The dried polymer (P4) subjected to surface crosslinking had a solid content ratio of 98.5% by mass and a proportion of the particles remaining on the sieve having a mesh opening size of 2,800 μm of 7.5% by mass in terms of solid content. The fine powder (B4) had a solid content ratio of 95.4% by mass and a mass average particle diameter (D50) of 114 μm.

Example 9

The same operation as in Example 8 was performed except for changing the fine powder (A3) to the fine powder (B4) in Example 8. The granulated gel (9) had a moisture content of 50% by mass, a number average particle diameter of 1.3 mm, and a degree of aggregate disintegration 60 minutes after collection of 22 cm. After a lapse of 60 minutes after the collection of the granulated gel, the granulated gel was used for the next experiment. The temperatures of the particulate hydrogel (P3) and granulated gel (9) immediately before charging into the feeder were respectively 95° C. and 60° C. In the resulting dried polymer (9), the proportion of the particles remaining on the sieve having a mesh opening size of 2,800 μm was 4.8% by mass in terms of solid content. There was no problem with the roll mill crushing.

Example 10

The same operation was performed except for using 69 kg/hr of 1.38% by mass lauryl dimethyl amino acetic acid betaine aqueous solution in place of 166 kg/hr of 0.253% by mass lauryl dimethyl amino acetic acid betaine aqueous solution in Example 9. The resulting granulated gel (10) had a moisture content of 30% by mass, a number average particle diameter of 1.6 mm, and a degree of aggregate disintegration 60 minutes after collection of 20 cm. After a lapse of 60 minutes after the collection of the granulated gel, the granulated gel was used for the next experiment. The temperatures of the particulate hydrogel (P3) and granulated gel (9) immediately before charging into the dryer were respectively 95° C. and 60° C. In the resulting dried polymer (10), the proportion of the particles remaining on the sieve having a mesh opening size of 2,800 μm was 6.3% by mass in terms of solid content. There was no problem with the roll mill crushing.

energy, the hydrogel is finely crushed to increase the surface area of the granular hydrogel. Thus, even in a case where a mixture of the granular hydrogel and the granulated gel are stacked and dried, the mixture is less likely to be densely stacked. As a result, it is possible to dry in very shorter time compared to the granular hydrogel obtained by gel crushing under the normal condition. Further, since the shape of the granulated gel and granular hydrogel are similar, they tend to be uniformly dried.

According to Examples 8 and 9, the present invention can be applied to drying by a stirring dryer. Further, when the fine powder (B) after the surface crosslinking step is used, large particles having a particle diameter of 2,800 μm or more, which tend to cause a non dried product, decrease more than the case of using the fine powder (A) before the surface crosslinking step.

According to Example 10, the present invention can be even applied to a granulated gel having a low moisture content (high solid content) of 30% by mass.

The invention claimed is:
1. A method for producing a water absorbent resin comprising:
  i) a polymerization step of polymerizing an aqueous monomer solution to obtain a hydrogel crosslinked polymer;
  ii) a gel crushing step of crushing the hydrogel crosslinked polymer, the step being performed in the middle of and/or after the polymerization step i);
  iii) a drying step of drying the hydrogel crosslinked polymer after the gel crushing step ii);
  iv) a crushing step of crushing a dried polymer after the drying step iii);
  v) a classifying step of removing fine powder from the dried polymer after the drying step iii); and
  vi) a fine powder recycling step of recycling the fine powder removed in the classifying step v) before the drying step iii),

TABLE 2

|  | Temperature of fine powder [° C.] | Temperature of aqueous liquid [° C.] * | Time lapse from granulation start [min] | Temperature of granulated gel (immediately before mixture) [° C.] | Temperature of particulate hydrogel (immediately before mixture) [° C.] | Non-dried product | Degree of aggregate disintegration (cm) |
|---|---|---|---|---|---|---|---|
| Example 8 | 60 | 50 | 60 | 60 | 95 | Absent | 20 |
| Example 9 | 60 | 50 | 60 | 60 | 95 | Absent | 22 |
| Example 10 | 60 | 50 | 60 | 60 | 95 | Absent | 20 |

* containing no water vapor (Summary)

According to Examples 1, 2, and 7, and Comparative Examples 1 to 3, it is found that the temperatures of the granulated gel and hydrogel immediately before mixing are controlled to the range of the present invention, whereby both gels can be favorably mixed, and the resulting dried polymer has no non-dried product.

According to Examples 3 and 4, as shown in the results of the degree of aggregate disintegration, when a heated aqueous liquid (hot water) is added to fine powder, and a surfactant aqueous solution is added to perform granulation, a granulated gel having the same particle diameter as that of the granulated gel (1) of Example 1 but having a higher flowability than that of the granulated gel (1).

According to Examples 5-1, 5-2, and 6, when the hydrogel is crushed by a predetermined level of gel crushing wherein the fine powder recycling step vi) includes:
  vi-1) a granulation step of mixing the removed fine powder and an aqueous liquid to obtain a granulated gel, wherein the aqueous liquid is added in an amount of 10 parts by mass or more and less than 100 parts by mass relative to 100 parts by mass of the fine powder, a mixing time of the aqueous liquid and the fine powder is 1 second or more and 3 minutes or less;
  vi-2) a granulated gel adding step of adding the granulated gel to the hydrogel crosslinked polymer in at least one step of and/or between the steps i) to iii) until completion of drying in the drying step iii); and
  vi-3) a gel mixing step of mechanically mixing the hydrogel crosslinked polymer and the added granulated gel in at least one step of and/or between steps from the granulated gel adding step vi-2) to completion of drying in the drying step iii), wherein, in the granulated gel adding step vi-2),
a temperature difference between a temperature of the granulated gel and a temperature of the hydrogel is 40° C. or less,
a time period from addition of the granulated gel to the hydrogel to the start of the mechanical mixing is within 5 minutes,
a solid content of the granulated gel is in a range of 50 mass % or more to 90 mass % or less, and
a temperature of the granulated gel is in a range of 50° C. or more to 100° C. or less.

2. The method according to claim 1, wherein
a solid content of the granulated gel adding step vi-2) is in a range of 55 mass % or more to 85 mass % or less.

3. The method according to claim 1, the method further includes
a surface crosslinking step vii) of performing surface crosslinking treatment to a water-absorbent resin after removing the fine powder in the classification step v), and
a sizing step viii) of removing a fine powder from a water-absorbent resin after the surface crosslinking step vii),
wherein
a fine powder having a mixing ratio (mass ratio) of the fine powder removed in the classifying step v) and the fine powder removed in the sizing step viii) in a range of 99:1 to 50:50 is used as the fine powder for mixing with the aqueous liquid in the fine powder recycling step vi).

4. The method according to claim 1, wherein
the mechanical mixing is performed by using a swing belt type feeder or by rotating stirring before the drying step iii) or until completion of drying in the drying step iii).

5. The method according to claim 1, wherein
drying is performed by a stirring dryer in the drying step iii).

6. The method according to claim 1, wherein
drying is performed by a ventilation band type dryer in the drying step iii);
an average thickness of a gel layer of an object to be dried spread on the ventilation band is 3 cm or more; and
a thickness variation ratio in the ventilation band is in a range of 1.05 or more to 3 or less.

7. The method according to claim 1, wherein
a dew point of an atmosphere of the granulated gel is 50° C. or more between the granulation step vi-1) and the granulated gel adding step.

8. The method according to claim 1, wherein
a time period from a start of mixing of the fine powder and the aqueous liquid in the granulation step vi-1) to an addition of the resulting granulated gel to the hydrogel in the granulated gel adding step vi-2) is within 5 minutes.

9. The method according to claim 1, wherein
a surface tension of an extract extracted from the granulated gel with a 0.9% by mass sodium chloride aqueous solution is 65 mN/m or more, wherein the granulated gel is obtained by adding a surfactant before, in the middle of, or after one step selected from the polymerization step i), the gel crushing step ii), the drying step iii), the crushing step iv), and the classifying step v), and/or allowing a surfactant to be contained in an aqueous liquid, and mixing the fine powder and the aqueous liquid in the granulation step vi-1).

10. The method according to claim 1, wherein
the aqueous liquid is added a plurality of times in the granulation step vi-1);
a surface tension of an extract extracted from the granulated gel with a 0.9% by mass sodium chloride aqueous solution is 70 mN/m or more, the granulated gel being obtained by mixing the aqueous liquid added in the first time and the fine powder,
at least one time addition of the aqueous liquid out of aqueous liquids of a second and later addition contains a surfactant, and
a surface tension of an extract extracted from the granulated gel with a 0.9% by mass sodium chloride aqueous solution is 60 mN/m or more, the granulated gel being obtained by mixing the aqueous liquid containing the surfactant.

* * * * *